United States Patent
Brill et al.

(10) Patent No.: US 7,158,966 B2
(45) Date of Patent: Jan. 2, 2007

(54) USER INTENT DISCOVERY

(75) Inventors: Eric D. Brill, Redmond, WA (US); Harold C. Daume, III, Culver City, CA (US)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 10/796,378

(22) Filed: Mar. 9, 2004

(65) Prior Publication Data

US 2005/0203878 A1   Sep. 15, 2005

(51) Int. Cl.
G06F 17/30 (2006.01)

(52) U.S. Cl. .................................. 707/3; 707/1; 707/4

(58) Field of Classification Search ............... 707/1–3, 707/100, 103; 717/108
See application file for complete search history.

(56) References Cited

U.S. PATENT DOCUMENTS

| | | | |
|---|---|---|---|
| 6,289,353 B1 * | 9/2001 | Hazlehurst et al. ......... 707/102 |
| 6,732,088 B1 * | 5/2004 | Glance ............................ 707/3 |
| 2002/0052674 A1 * | 5/2002 | Chang et al. ............... 700/300 |
| 2003/0101286 A1 * | 5/2003 | Kolluri et al. .............. 709/316 |
| 2003/0135495 A1 * | 7/2003 | Vagnozzi ....................... 707/3 |
| 2005/0102259 A1 * | 5/2005 | Kapur ........................... 707/1 |

OTHER PUBLICATIONS

Bodo Billerbeck, et al., Query Expansion using Associated Queries, Proceedings of the twelfth international conference on Information and knowledge management, 2003, pp. 2-9, New Orleans, Louisiana, USA.

Andrei Broder, A Taxonomy of web search, IBM Research, 2002, 8 pages.
Susan Dumais, et al., Optimizing Search by Showing Results in Context, SIGCHI'01, 2001, pp. 277-284, Seattle, Washington, USA.
Susan Dumais, et al., Hierarchical Classification of Web Content, SIGIR 2000, 2000, pp. 256-263, Athens, Greece.
Doug Beeferman, et al., Agglomerative clustering of a search engine query log, KDD 2000, 2000, pp. 407-416, Boston, Massachusetts, USA.
Anton Leuski, et al., Details of Lighthouse, University of Massachusetts, 2000, pp. 1-15, Amherst, Massachusetts, USA.
Oren Zamir, et al., Grouper: A Dynamic Clustering Interface to Web Search Results, University of Washington, 1999, 15 pages, Seattle, Washington, USA.
Jaime Carbonell, et al., The Use of MMR, Diversity-Based Reranking for Reordering Documents and Producing Summaries, SIGIR'98, 1998, pp. 335-336, Melbourne, Australia.
Sergey Brin et al., The Anatomy of a Large-Scale Hypertextual Web Search Engine, Stanford University, 1998, pp. 1-18.
European Search Report dated Mar. 8, 2006 mailed Mar. 16, 2006 for European Patent Application Serial No. 05101639, 4 Pages.

(Continued)

*Primary Examiner*—Alford W. Kindred
(74) *Attorney, Agent, or Firm*—Amin, Turocy, & Calvin, LLP

(57) ABSTRACT a system 100 that facilitates determining a user's intent given a user search query comprises a search engine that is employed to search over a collection of objects within a data store to retrieve a user search result set. The objects within the result set are associated with queries that were previously utilized to locate such objects. A level of relatedness between the previous queries and the user search query is determined, and previous queries that are associated with a result set that is novel and related to the user search result set are returned to the user.

33 Claims, 18 Drawing Sheets

OTHER PUBLICATIONS

Glance N S ED—Lester J C (ED) Association for Computing Machinery: "Community Search Assistant" 2001 International Conference on Intelligent User Interfaces. IUI 2001. Santa Fe, NM, Jan. 14-17, 2001, Annual International Conference on Intelligent User Interfaces, New York, NY: ACM, US, 2001.

L Fitzpatrick and Dent M ED—Belkin N J et al Association for Computing Machinery: "Automatic Feedback Using Past Queries: Social Searching?" Proceedings of the 20th Annual International ACM-SIGIR Conference on Research and Development in Information Retrieval. Philidelphia, PA, Jul. 27-31, 1997, Annual International ACM-SIGIR Conference on Research and Development in Information Retriev, 1997.

V V Raghavan, et al., Association for Computing Machinery: "On the Reuse of Past Optimal Queries" SIGIR '95. Proceedings of the 18th Annual International ACM SIGIR Conference on Research and Development in Information Retrieval, Seattle, Jul. 9-13, 1995, SIGIR. Proceedings of the Annual International ACM SIGIR Conference on Research and Develo, Jul. 9, 1995.

U Nambiar et al.: "Answering Imprecise Database Queries: A Novel Approach" WIDM' 03, New Orleans, Louisiana, USA, Nov. 7, 2003.

B D Davison, et al.: "Finding relevant Website Queries" WWW2003, Twelfth International World Wide Web Conference, May 20, 2003.

W W Chu et al.: "Association query answering via query feature similarity" Intelligent Information Systems, 1997. IIS '97. Proceedings Grand Bahama Island, Bahamas Dec. 8-10, 1997, Los Alamitos, CA, USA, IEEE Comput. Soc, US, Dec. 8, 1997.

V Menkov et al: "Antworld: A Collaborative Web Search Tool" Internet Citation, Feb. 18, 2001.

* cited by examiner

USER INTENT DISCOVERY

TECHNICAL FIELD

The present invention relates generally to searching over a collection of objects, and more particularly to systems and methods that facilitate determining user intent with respect to a user query via providing the user with queries that correspond to return results that partially overlap return results of the user query.

BACKGROUND OF THE INVENTION

The evolution of computers and networking technologies from high-cost, low performance data processing systems to low cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wire or wireless technology, can provide a user with a channel for nearly instantaneous access to a wealth of information from a repository of web sites and servers located around the world, at the user's fingertips.

Typically, the information available via web sites and servers is accessed via a web browser executing on a web client (e.g., a computer). For example, a web user can deploy a web browser and access a web site by entering the web site Uniform Resource Locator (URL) (e.g., a web address, an Internet address, an intranet address, . . . ) into an address bar of the web browser and pressing the enter key on a keyboard or clicking a "go" button with a mouse. The URL typically includes four pieces of information that facilitate access: a protocol (a language for computers to communicate with each other) that indicates a set of rules and standards for the exchange of information, a location to the web site, a name of an organization that maintains the web site, and a suffix (e.g., com, org, net, gov and edu) that identifies the type of organization.

In some instances, the user knows, a priori, the URL to the site or server that the user desires to access. In such situations, the user can access the site, as described above, via entering the URL in the address bar and connecting to the site. In other cases, the user will know a particular site that such user desires to access, but will not know the URL for such site. To locate the site, the user can simply enter the name of the site into a search engine to retrieve such site. In most instances, however, the user is simply searching for information relating to a particular topic and does not know a name of a site that contains the desirable information. To locate such information, the user employs a search function (e.g., a search engine) to facilitate locating the information based on a query provided by the user. Generating a query that will locate the desired information, however, can be difficult for typical searchers. More particularly, providing a query that sufficiently represents intent of the user (e.g., what information the user intends to locate) is problematic for most users. For instance, empirical data suggests that most search queries are approximately two words in length, which generally is insufficient to locate particular information based upon the query (e.g., the queries are under-specified with respect to information they desire to obtain).

Currently there are a plurality of techniques employed by search engines to assist a user in narrowing a search given an underspecified query. A first approach includes employing humans to manually classify objects in a database (e.g., sites on the Internet) in a logical hierarchical manner. Such systems can be searched efficiently and are highly accurate, but are expensive to build in terms of man-hours required for classifying each object within the hierarchy. Furthermore, this technique cannot achieve sufficient coverage for many users, as objects cannot be searched for until classified. A disparate approach utilizes machine-learned text classification to automatically classify objects within a hierarchical shell. This approach achieves benefits with respect to coverage, and systems built utilizing such approach are less expensive to build (e.g., numerous humans are not required to continuously insert objects in a hierarchy). However, the hierarchical shell requires building, and such text classification schemes are static and cannot morph to fit needs of disparate users. Moreover, systems built utilizing this technique cannot adapt over time without considerable expense in re-arranging the hierarchy.

Conventional search engines can also utilize clustering techniques to mitigate the aforementioned deficiencies. For example, sites can be clustered to facilitate obtaining more relevant results with respect to a search query. A link entitled "more like this" can be associated with a returned result, and selection of the link can facilitate further clustering and/or display of documents within the cluster associated with the "more like this" link. A relevant document (and thus a relevant cluster) located via the query, however, can be returned to the user in a position that indicates that the document is not highly relevant to the query. Thus, the user could be forced to read through pages of documents in order to locate information that the user intended to find. Furthermore, the constant clustering of documents is computationally expensive.

Another exemplary system that conventional search engines employ provides a user with a query when the user's entered query does not return any documents. For instance, a user can desire to find information regarding Mozart's early works. The user, as is typical, may intent to enter an under-specified query of "classical music." If, however, due to mistake the user enters the query "classical music", the search engine can determine that no documents are returned utilizing the query (because of the typo in the query). Thereafter, the search engine can prompt the user with a query that the search engine finds is substantially similar to the entered query. For instance, the search engine could prompt the user by asking, "Did you mean 'classical music?'" If the user answers positively, the correct query can be run and results can be obtained. While such a system is useful with respect to correcting typos and misspellings, it does not provide results that are highly germane to Mozart's early works (the user's true intent). Rather, the user will be flooded with a substantial amount of information that, while related to classical music, is not related to Mozart's early works. For example, the user may have to look through hundreds of listings before locating a document containing desirable information.

Accordingly, there exists a strong need in the art for a searching system and/or methodology that assists a user in utilizing a query that will obtain results according to the user's intent.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention is based upon the inventors' realization that users typically have difficulties in transferring thoughts within the mind to a user search query. More particularly, individuals have difficulty generating a query that can locate objects within a data store (e.g., the Internet) that they intend to find. The present invention is directed to assisting the user to discover their intent with respect to objects that are desirably searched over. This is accomplished via associating each object within a data store that is searched over with queries that were previously employed to locate such object(s). For example, several disparate queries can be utilized to find a substantially similar object. Thus, each time an object is accessed via a query, such query is associated with the object. For instance, each query (or a signature thereof) entered into a search engine can be stored, and objects located by such queries (result sets) can likewise be stored. It is to be understood, however, that any manner of associating objects with queries previously employed to locate such objects is contemplated by the present invention.

A search component receives a user query and searches the data store for objects according to such user query. The collection of returned objects creates a result set for the query. In accordance with one aspect of the present invention, the result set can be limited to a threshold number of highly ranked objects. This can be beneficial when a search utilizing the user query would return numerous (e.g., millions) of objects. Objects within the result query are reviewed, and previous queries that were employed to locate such objects are considered. These previous queries are also associated with a result set (e.g., a collection of objects that are returned when a search is performed utilizing the previous queries). A goal of the present invention is to select previous queries that have result sets that are related to the result set of the user search query, but are not substantially similar thereto, and display such queries to the user. Previous queries with substantially similar result sets, however, are not simultaneously displayed to the user. This is because displaying previous queries with substantially similar result sets will not assist the user in connection with a search. Rather, the user will be flooded with similar queries. After relevant previous queries are displayed, the user can review the previous queries and determine whether one or more of the previous queries better represents his/her intent when compared to the user search query. Furthermore, the user can select a displayed previous query to review the result set associated with such query. Thus, the user can quickly locate desired objects by utilizing queries previously employed to locate such objects.

In accordance with one particular aspect of the present invention, distance metrics between the user search query and previous queries are employed to determine which queries to display to the user. These distance metrics are determined based on the return sets of the user search query and the previous queries. Upon determining the distance metrics, a modified maximal marginal relevance scheme can be utilized to locate previous queries that have return sets that are both related to the return set of the user search query and novel when compared with such return set of the user search query. More particularly, objects within the return set of the user search query will be related to objects within the return set of the previous query, but the return sets will not be substantially similar. This scheme effectively partitions a return set according to a user search query into a plurality of related return sets that have been located via previous queries.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
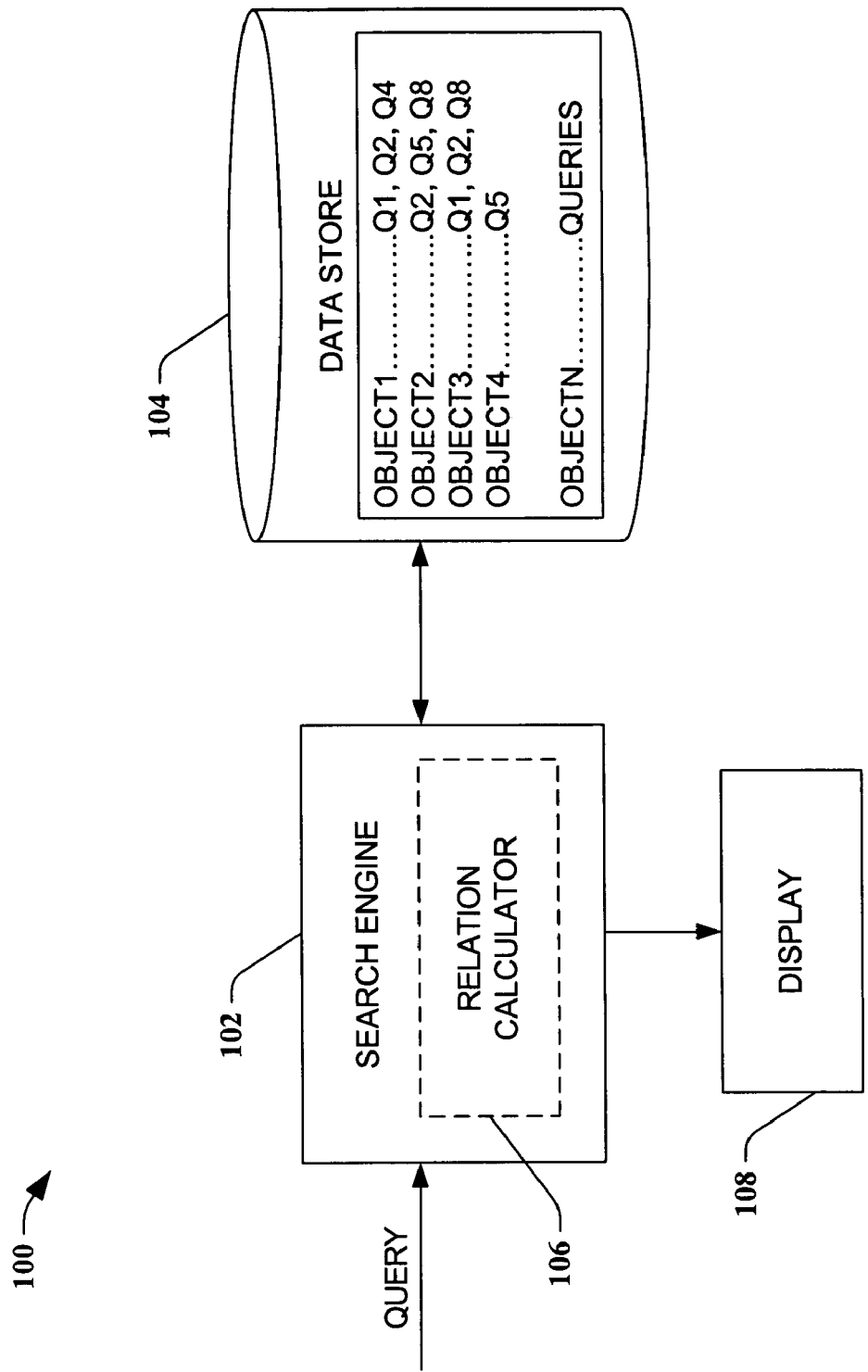
FIG. 1 is a block diagram of a system that facilitates determination of search intent of a user in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Turning now to FIG. 1, a system 100 that facilitates determining a user's intent given a user search query is illustrated. The system 100 includes a search engine 102 that receives a query, and is employed to search over objects within a data store 104 according to such query. The search engine 102 can employ any suitable search algorithm(s) to locate, rank, and retrieve objects that are resident within the data store 104. Furthermore, the search engine 102 can be utilized for any suitable search. For instance, the search engine 102 can complete a textual search as is typical when searching over the Internet. The search engine 102, however, can also be employed to utilize color schemes to search for a collection of images, sound bytes to search for particular sounds, or any other suitable objects that are desirably searched by a user. Furthermore, a query received by the search engine 102 is not limited to being a string of text. For example, the query can be a sound or series of sounds, a shape, a color pattern, etc.

Upon receiving the query, the search engine 102 searches over a collection of objects in the data store 104 and retrieves objects according to the query. In accordance with one aspect of the present invention, the data store 104 can reside on a server and include a plurality of web pages or other documents that can reside on the Internet and/or an intranet. Moreover, the data store 104 can reside within a hard drive and/or memory of a personal computer (e.g., a client). It is to be understood that the data store 104 and the objects within such data store 104 are not to be limited to web pages that reside on the Internet and/or an intranet. The data store 104 (or a separate data store, the search engine 102, . . . ) can correlate objects within the data store with queries that were previously employed to retrieve such objects. For example, an object1 within the data store 104 has been previously located via the search engine 102 in connection with queries Q1, Q2, and Q4. Similarly, an object 2 within the data store 104 has been previously located by the search engine 102 in connection with queries Q2, Q5, and Q8. Oftentimes, the query received by the search engine will be under-specified, thus causing a return of a substantial number of objects that are not related to objects that a user intended to find. The present invention partitions the result set according to the received query by utilizing disparate queries that were previously employed to locate objects within the data store 104.

More particularly, given a particular query the search engine 102 retrieves a plurality of objects (an initial return set) that are existent within the data store 104, wherein the objects are associated with queries utilized previously to locate such objects. Within the initial return set is at least one object that is desirably reviewed by a user who entered the query into the search engine 102 (e.g., the user intended to locate such object but did not generate a particular enough query). The search engine 102 is associated with a relation calculator 106 that partitions the initial return set into a plurality of return sets based upon return sets of the queries that are associated with the objects in the data store 104. The relation calculator 106 essentially reviews each query (the return set associated with each query) that is associated with objects within the initial return set, and determines a level of relation between the initial query and queries previously employed to locate objects within the initial return set. The relation calculator 106 then can determine a plurality of queries that a user may find useful in locating one or more objects. Queries that are both highly related to the initial return set yet produce disparate objects can be returned to the user via a display 108. For instance, a query that returns substantially identical objects within a first plurality of objects according to a ranking given by the search engine 102 is highly related, but does not produce novel results. In a more particular example, the initial query can be "fly fishing." A related query would be "fly & fishing", but substantially similar objects would be returned, for instance, on a first page of results. Thus the relation calculator 106 would not return such query to the user, as the query would produce substantially similar results. Likewise, a query that results in a return of mostly unrelated objects would not be returned to the user, as the relation calculator 106 would determine that such query is mostly unrelated. For a particular example, an object directed towards dance can include a small segment regarding fly fishing. Most queries related to that object, however, would return numerous objects related to dance rather than objects related to fly fishing. The relation calculator 106 can thus determine a level of relatedness between the initial query and queries associated with objects returned via the initial query, and return queries to the user that are associated with related objects as well as novel objects.

In one particular example, Q can be a set of queries that were previously employed by the search engine 102 in connection with searching for objects in the data store 104 or other similar data store, and q can be a query that is entered by a user into the search engine 102. D can a set of objects that are located within the data store 104, and d can be one particular object that the user intends to find via the query q. R can be defined as a binary relation on Q×D where qRd if and only if d is in the return set for the query q. Thus, given the query q, the relation calculator 106 can locate all queries q' such that $(\exists d \in D)(qRd \wedge q'Rd)$. More particularly, the relation calculator 106 determines a return set $(R^{-1} \circ R)$ [q]. It is to be understood, however, that queries outside of this result set can be located and displayed in accordance with the present invention. For example, a different measure of query relatedness can be employed in connection with the present invention. In most instances the return set $(R^{-1} \circ R)$ [q] is extremely large for an underspecified query (e.g., an underspecified query can have thousands of related queries). As it is impractical to present thousands of queries to the user, the relation calculator 106 can employ various algorithms to measure relatedness between the initial query q and queries within the return set $(R^{-1} \circ R)$[q]. In accordance with one aspect of the present invention, the relation calculator 106 can employ the algorithm $$\|q, q'\| = 1 - \frac{|R[q] \cap R[q']|}{|R[q] \cup R[q']|},$$

and thereafter sort a set of related queries according to $\|q,q'\|$ and return a number of the top queries to the user.

In accordance with one aspect of the present invention, relative rankings can be considered in connection with calculating the distance metric $\|q,q'\|$. For example, a position that an object d is returned for two queries q and q' can be accounted for in connection with calculating the distance metric. More particularly, the distance metric can be calculated disparately when the object d is the first result returned for each of the two queries q and q' as compared to when the object d is the $100^{th}$ result returned for one or more of the two queries q and q'. For instance, the distance metric can be calculated as follows:

$$\|q, q'\| = 1 - \frac{\sum_{d \in R[q] \cap R[q']} w(d)}{\sum_{d \in R[q] \cup R[q']} w(d)},$$

where w is a query-independent weighting function for an object (e.g., an object's PageRank). As long as a range of w is positive, the function defined above is a distance metric. It is to be understood, however, that relative rankings are not required for consideration in order for one or more aspects of the present invention to operate effectively.

Typically, however, a set of related queries sorted according to the distance metric $\|q,q'\|$ will be too similar to the initial query to benefit the user (e.g., the queries will return objects substantially similar to objects returned via the initial query). Thus, a modified maximal marginal relevance (MMR) scheme or other suitable relevance scheme can be employed to find queries that return related objects but do not return substantially similar objects as compared to the result set of the initial query. The modified MMR scheme can be employed by the relation calculator 106 to return queries with result sets that are both relevant and original to a user. More particularly, the modified MMR scheme can be employed by the relation calculator 106 to present a user with queries q' that have result sets that are related to the result set of the initial query q, but are novel with respect to result sets of the initial query and other queries that have been previously returned. In accordance with one aspect of the present invention, the relation calculator 106 can utilize the following algorithm to determine a relation measurement for queries within the query set Q:

$$\operatorname*{argmin}_{q'} \left[ \lambda \|q, q'\| - (1 - \lambda) \min_{q''} \|q', q''\| \right],$$

where λ is an interpolation factor that is established a priori, q is the initial query, q' is a related query to the initial query q but different from other queries q'' already returned. The queries q' are drawn from unreturned query expansions and queries q'' are drawn from a previously returned set. Queries can thereafter be iteratively selected according to the relation measurement. The above equation is based upon a MMR scheme that was originally introduced to rank documents in a pure informational retrieval setting, wherein documents returned were to be simultaneously relevant and original. A similarity metric $s_q$ that illustrates similarities between documents and queries, as well as a similarity metric $s_d$ that illustrates similarity between documents and other documents is employed with the conventional scheme. Documents are thereafter iteratively selected according to a following weighting:

$$\operatorname*{argmax}_{d \in D} \left[ \lambda s_q(q, d) - [1 - \lambda] \max_{d' \in D'} s_d(d, d') \right],$$

where D is a set of objects not yet returned and D' is a set of objects already returned. As with the modified MMR scheme, λ is an interpolation factor that has been previously chosen. This algorithm selects an object d which is maximally similar to the query q and simultaneously maximally different from other documents previously returned, d'. For example, when λ=1, the ranking is simply according to a similarity between the object d and the query q. When λ=0, the algorithm attempts to produce maximally different results independent of the query q. The modified MMR scheme was derived due to the present inventors' realization that previously generated queries can assist a user in locating an object that the user intended to find.

Upon the relation calculator 106 indexing related yet novel queries (with respect to objects returned), such queries can be relayed to a user via the display 108. Thus, for example, a plurality of queries related to the initial query can be displayed to the user, which can assist the user in locating an object that such user intended to find. Furthermore, an integer number of objects retrieved based upon the initial query can be returned to the user, thus enabling the user to view such objects in an instance that the user did not under-specify the query.

While the present invention can be employed in connection with assisting a user who utilizes an underspecified query, it is to be understood that the present invention can also be employed to assist one or more users who relay any suitable query of interest to the search engine 102. Furthermore, the present invention can be utilized to assist a user in serendipitously locating information. For example, a user can provide a general query, and the present invention can return information that is tangentially related to such query. More particularly, a user can enter a query "honeymoon" to the search engine 102, and a return set of objects within the data store 106 can be located according to such query. The relation calculator 106 can thereafter be employed to locate queries that are not necessarily more specific than the initial query of honeymoon, but are nevertheless related (e.g., related serendipitously). For instance, the query "passport applications" could be a query returned to the user based upon the initial entered query of "honeymoon." This is possible via requiring less overlap between return sets of the initial query and contemplated queries. For example, return sets from the query "honeymoon" will have less overlap with a return set of a query "passport application" when compared to a return set of a query "honeymoon suites." More overlap between return sets of queries results in more similar and less serendipitous queries being returned—less overlap between return sets of queries results in more serendipitous and less similar queries being returned. In accordance with one aspect of the present invention, a component (not shown) can be provided that enables a user to select a level of overlap between return sets. Furthermore, a level of overlap between return sets can be specified automatically based at least in part upon one or more of user identity, user state, and user context.

Figure 2:
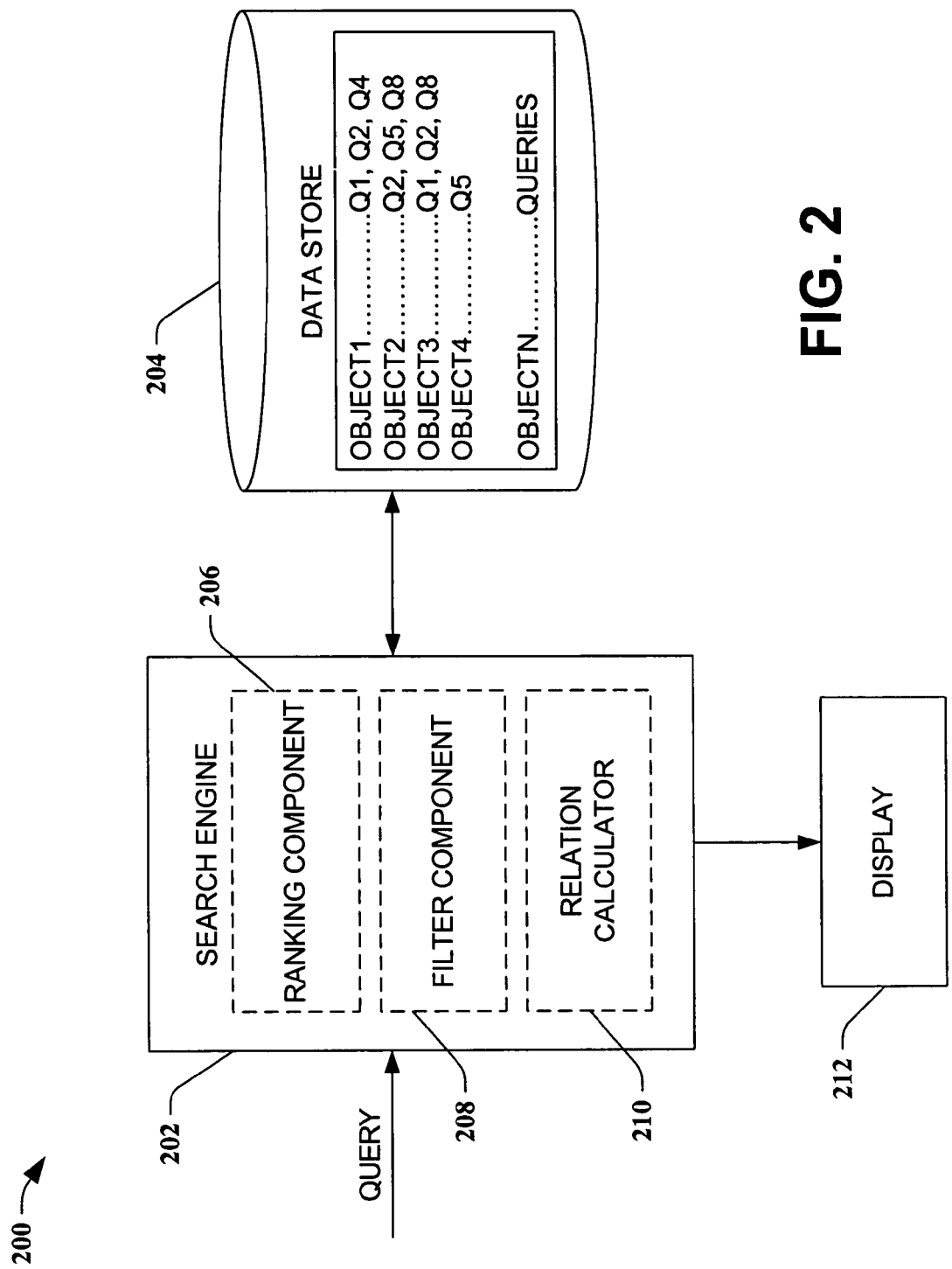
FIG. 2 is a block diagram of a system that facilitates determination of search intent of a user in accordance with an aspect of the present invention.

Turning now to FIG. 2, a system 200 that facilitates searching over a collection of objects is illustrated. The system 200 utilizes an initial query that is provided by a user, and locates queries that were previously generated (e.g., by disparate users) that are related to the initial query yet do not return substantially similar objects as those returned when employing the initial query. A search engine 202 receives the initial query, and utilizes such query to search over a plurality of documents in a data store 204. The search engine 202 can employ various algorithms in connection with locating and returning objects within the data store 204. For instance, the search engine 204 can perform a textual search (e.g., return objects based upon meta tags, text within the objects, . . . ), a search based at least in part upon clustering, etc. The data store 204 includes a plurality of objects that can be retrieved via the search engine, and each object is associated with one or more queries previously employed by the search engine 202 to locate such objects. For example, the search engine 202 has previously retrieved object1 when queries Q1, Q2, and Q4 were employed. While the queries associated with the objects are illustrated as being within the data store 204, it is to be understood that such queries can reside elsewhere. For instance, the search engine 202 itself can retain a list of queries and names (e.g., URLs) of objects that were retrieved via the queries. Similarly, the search engine 202 can retain a list of objects that have been previously retrieved as well as queries employed to retrieve such objects. Furthermore, the lists of objects and queries can be condensed via hashing or other similar technique.

Upon receiving the query, the search engine 202 locates a plurality of objects within the data store 204 according to such query. The search engine 202 can include a ranking component 206 that is utilized to rank returned objects according to relevance of such objects to the query. In instances that the query is underspecified, however, thousands of objects that are found to be relevant to such query can be returned to a user and ranked by the ranking component 206. Furthermore, as thousands of objects can be located and returned, a substantial number of queries that were previously employed to locate such objects are also existent. Reviewing each query for every object returned to determine relatedness to the initial query, however, can be computationally expensive. A filter component 208 can be provided to reduce a number of objects that will be considered. For instance, the filter component can filter objects that are not ranked as one of the top twenty objects by the ranking component 206. Furthermore, the filter component 208 can be employed to remove duplicate queries that correspond to returned objects. For instance, if the search engine 202 returns object1, which is associated with previous queries Q1, Q2, and Q4, as well as object3, which is associated with queries Q1, Q2, and Q8, the filter component 208 can ensure that queries Q1 and Q2 are not considered twice (or more than twice).

The search engine 202 also includes a relation calculator 210 that determines a level of relatedness between the initial query and queries that were previously utilized by the search engine 202. For example, if the initial query returns object1 from the data store 204, the relation calculator 210 can determine a level of relatedness between the initial query and query Q1, query Q2, and query Q3. The relation calculator 210 can also determine a level of relatedness between disparate queries that have been previously employed by the search engine 202 (e.g., queries Q1, Q2, . . . ). For instance, the relation calculator 210 can determine a level of relatedness between queries Q1 and Q2. This is beneficial when queries Q1 and Q2 return substantially similar documents—thus it would not be beneficial with respect to a user to display both queries Q1 and Q2. In accordance with one aspect of the present invention, the relation calculator 210 can determine a distance metric between the initial query and previously utilized queries, and the relation calculator can employ the distance metric in connection with a modified MMR algorithm to determine which previous queries are both related to the initial query and are also associated with a return set that includes novel objects. More particularly, providing a query that is associated with a return set that is substantially similar to a return set associated with the initial query would not assist the user in locating an object according to such user's intent. Rather, duplicate information would be provided to the user, thus hindering the user's search.

After the relation calculator 210 locates a plurality of queries that are related to the initial query but are associated with a novel return set, the filter component 208 can reduce a number of objects associated with the queries. For instance, the filter component 208 can be employed to allow display of only highly ranked objects within a return set associated with a query (e.g., the five object ranked the highest will be returned). Moreover, the filter component 208 can also be employed to remove objects from a return set associated with a returned query, wherein the objects are also within a return set of the initial query or other returned query. For example, a return set for the initial query can include object1, and query Q1 can be found as highly related to the initial query. As query Q1 was previously employed to locate object1, object1 will reside in the return set for the initial query as well as the return set for query Q1. The filter component 208 can be employed to remove object1 from the result set associated with Q1, thereby ensuring that the user will not receive duplicate objects. Furthermore, the filter component 208 can be utilized to remove queries that are lexically similar to the initial query. For instance, queries whose words are simply permutations of the initial query could be discarded. These lexically similar queries can be highly ranked by the relation calculator 210, but return sets associated with the initial query and the lexically similar queries are substantially similar, thus not providing the user with new information.

In accordance with another aspect of the present invention, the filter component 208 can remove queries from consideration that appear to be paths to a particular object. For instance, in an Internet context, all queries that include strings "www.", ".com", ".net", ".org", etc. can be removed from consideration, as it can be assumed that such queries were mistakenly placed in a search engine query box rather than an address bar of a browser. Return sets associated with these strings generally are not germane to a user's intent, and presenting a URL, path, or other similar identifying indicia of a particular object can be confusing to the user. The filter component 208 can also be employed to remove queries that do not appear to be in a desirable language. For instance, all queries associated with objects in the return set relating to the initial query that include ASCII characters that are not printable can be removed. Moreover, related queries that are not at least as long (in number of words) as the initial query can be removed to ensure that result sets of the related queries are more focused than the result set related to the initial query.

Once the relation calculator 210 and the filtering component 208 have completed their operations, a plurality of queries that are related to the initial query but provide novel results (e.g., when comparing a particular number of highest ranked objects) can be delivered to a user via a display 212 or other suitable device that can relay such queries. Thereafter the user can review result sets associated with one or more queries that comports with the user's intent. In one particular example, suppose a user is interested in a particular lure that can be utilized in connection with fly fishing, but does not know a name of such lure. Thus, the user types in the initial query of "fly fishing", which returns numerous objects that the user must parse through prior to locating the lure. Utilizing the system 200, however, a related query such as "fly fishing lures" can be provided to the user, thus matching his intent.

Figure 3:
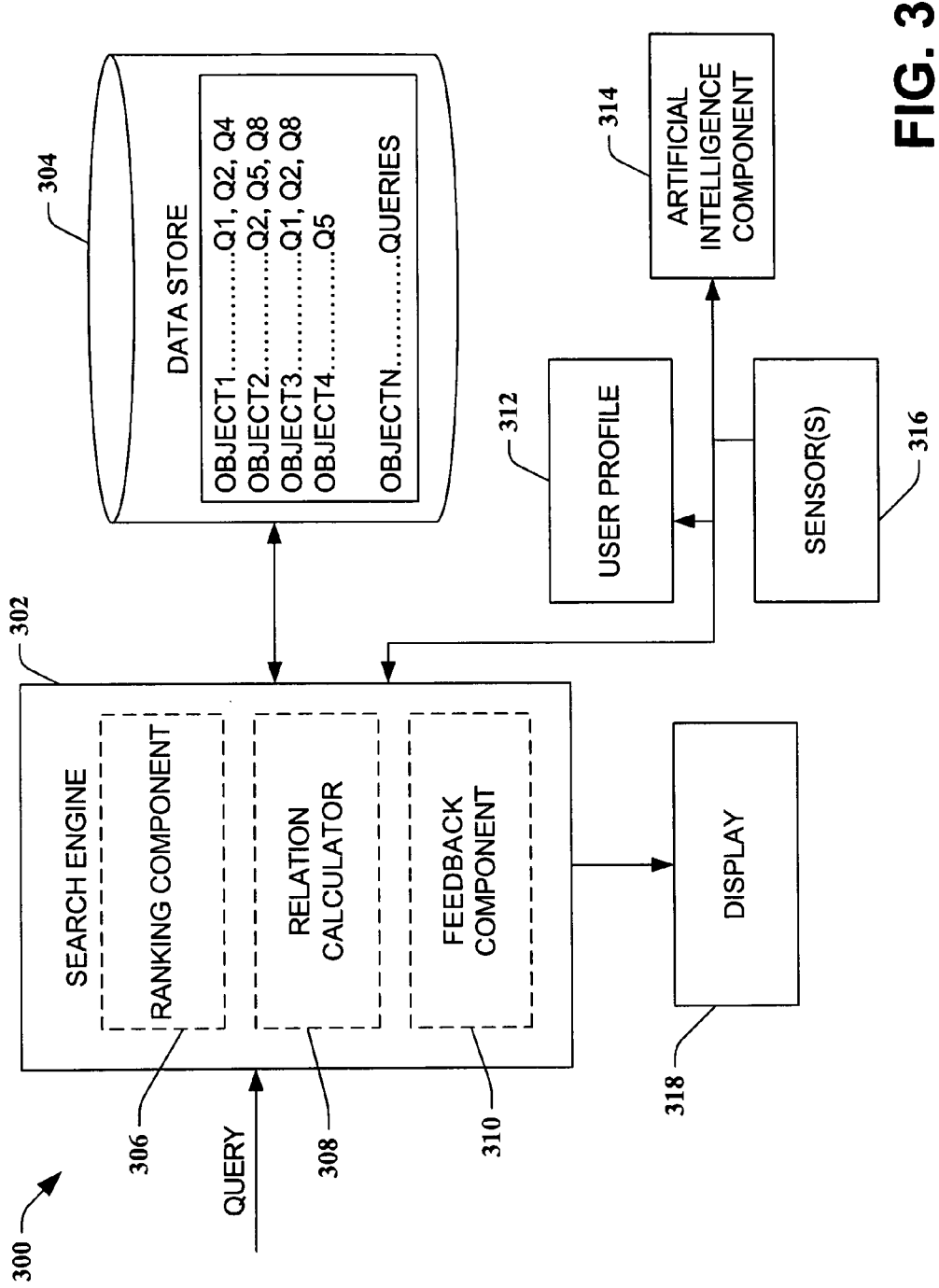
FIG. 3 is another block diagram of a system that facilitates determination of search intent of a user in accordance with an aspect of the present invention.

Now referring to FIG. 3, a system 300 that assists a user when such user is searching over a plurality of objects is illustrated. The system 300 utilizes a query and a result set associated with the query to locate related queries that were previously employed. The related queries are associated with a result set that is related to the result set of the initial query but not substantially similar thereto. The system 300 includes a search engine 302 that receives a query. The search engine 302 searches a data store 304 that includes a plurality of objects (e.g., documents, sound files, images, web pages, . . . ), wherein the search is based at least in part upon the received query. Each of the objects within the data store 304 is associated with queries that were previously utilized to locate such objects. For instance, query Q5 was previously employed by the search engine 302, wherein utilization of such query resulted in the return of object4. This association of objects and queries can be stored within the data store 304, within the search engine 302, or any other suitable storage location.

The search engine 302 includes a ranking component 306 that ranks objects that are located via the search engine 302 according to the query. Any suitable ranking algorithms and/or methodologies can be employed in connection with the present invention. In accordance with one aspect of the present invention, a number of results in the return set associated with the query can be limited. For instance, only the twenty most highly ranked objects can be included in the result set, and only queries associated with those twenty objects can be reviewed to determine relatedness of such queries to the initial query received by the search engine 302. It is to be understood, however, that any suitable number of objects can be included in the result set, and twenty is just one exemplary number that illustrates one aspect of the present invention.

The search engine 302 further includes a relation calculator 308 that is employed to review queries associated with objects in the return set, and return related queries to the user that have substantially different result sets from the result set obtained via the initial query. In accordance with one aspect of the present invention, distance metrics together with a modified MMR scheme can be employed to locate queries that are both related and are associated with novel result sets. The search engine 302 can also include a feedback component 310 that enables a user to communicate with the search engine 302 with respect to performance for such particular user. For instance, a user can inform the search engine 302 that it is not interested in particular queries, and that such queries should not be returned to a user. Furthermore, the feedback component 310 can be employed to clarify ambiguities that can result in connection with searches. For instance, a query of "rock" can signify a particular type of music as well as physical rock formations. The user can inform the feedback component 310 that he is interested in music and not to return queries associated with rock formations amongst the related queries. Furthermore, the feedback component 310 can be employed to manage a number of results to include within a result set, a number of queries to return to the user, a display format of queries and results, etc. Thus, the feedback component 310 allows the user to customize the system 300 to operate according to user preferences.

The system 300 can further be associated with a user profile 312 that further customizes the system 300 according to user preference. The user profile 312 can store information relayed to the feedback component 310, wherein such user profile can be accessed regardless of a device that the user is employing. For example, the user can create the user profile 312 at a desktop computer that is at his residence. The user profile 312, however, is not confined to that particular desktop computer. Rather, the user can access such user profile 312 at disparate terminals (e.g., a PDA, on a disparate computer, a cell phone, . . . ). Furthermore, the user profile 312 can include a history component that tracks the user's searches over a pre-determined period of time. Thus, if the user is interrupted in the midst of a search, such user can utilize the user profile 312 to access that search at a later time.

The search engine 302 can also be associated with an artificial intelligence component 314 that can make inferences regarding which queries to return to the user based at least in part upon user state, user history, and user context. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Thus, the artificial intelligence component 314 can watch a user and "learn" over time user desires given a particular user state and context. For instance, a user might typically desire to review certain types of objects at particular times of day and/or when the user is at particular locations. The artificial intelligence component 314 can receive data from various sensor(s) 316 (e.g., time of day, user location, temperature . . . ) and utilize such data to perform an appropriate inference. For example, a user that is using a PDA can enter the query "skiing" into the search engine 302. Sensor(s) 316 (e.g., a GPS sensor) can determine that the user is in mountains in Colorado, that the temperature is cooler, and that the time of year corresponds to snow skiing season. Thus, the artificial intelligence component 314 can infer that queries related to water skiing should not be returned to the user. In another example, a user may typically perform transactional searches (e.g., searches to purchase and/or sell items) on Saturdays after 3:00 p.m. The artificial intelligence component 314 can employ such information in connection with providing the user with optimal queries that are related to an initial query. Moreover, the artificial intelligence component 314 can employ a cost/benefit analysis with respect to informing the relation calculator 308 which queries to return to the user. More particularly, the artificial intelligence component 314 can balance a benefit of informing the relation calculator 308 that particular queries should be selected over other queries against a cost of having the relation calculator 308 remove a desirable query. Upon locating a plurality of queries that are both related to the initial query and are associated with result sets that are substantially disparate from the result sets of the initial query, such queries can be returned to the user via a display 318.

Figure 4:
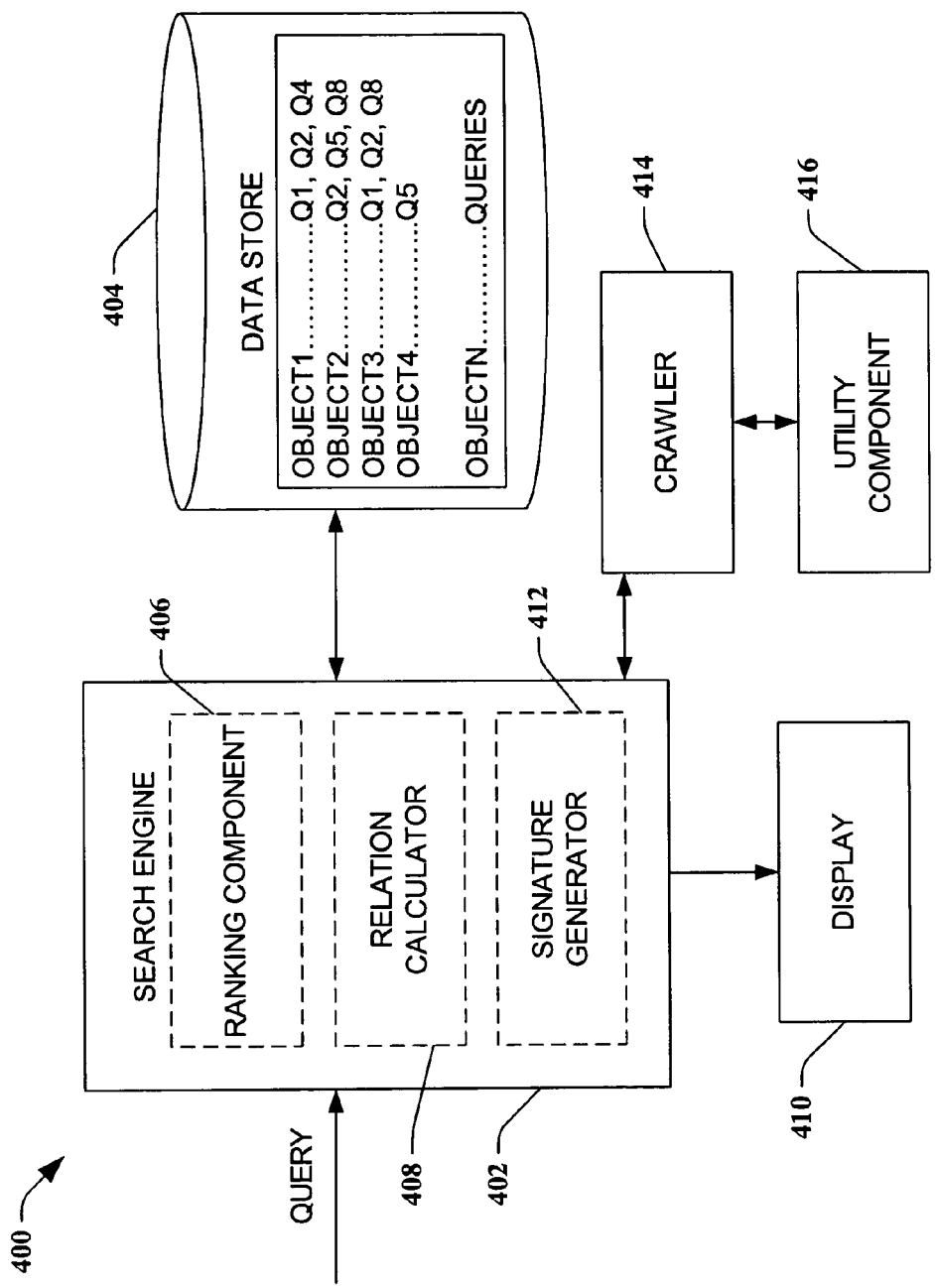
FIG. 4 is another block diagram of a system that facilitates determination of search intent of a user in accordance with an aspect of the present invention.

Now turning to FIG. 4, a system 400 that facilitates determining a user's intent given a particular query is illustrated. Typically, users provide search engines with under-specified queries, thus making it difficult to determine what the user intends to locate. The system 400 utilizes queries that were previously employed to locate objects within a return set associated with the under-specified query. More particularly, the system 400 includes a search engine 402 that is provided a query. The query originates from a user, a text-extracting program, or any other suitable mechanism that can generate a query. The search engine 402 utilizes the query to locate one or more objects within a data store 404, wherein the objects are associated with queries that were previously employed by the search engine 402 to locate such objects. For example, queries Q1, Q2, and Q4 were previously employed to locate object1. Upon locating objects according to the query, the search engine 402 employs a ranking component 406 to rank such queries. In accordance with one aspect of the present invention, objects that are not above a threshold ranking are discarded from the result set. A relation calculator 408 reviews queries that were previously employed to locate objects in the result set associated with the initial query. The relation calculator 408 ranks these previous queries according to their level of relation to the initial query and the initial result set. More particularly, previous queries that are related to the initial query and are associated with result sets that are not substantially similar to the result set associated with the initial query are given a higher rank than unrelated queries. For instance, distance metrics employed together with a modified MMR scheme can be employed to rank the previous queries. The most highly ranked queries can be returned to a user via a display 410.

The search engine 402 can also include a signature generator 412 that creates signatures for queries and objects located via such queries. For instance, the signature generator 412 can maintain a query log and generate hashes of objects located by the search engine when utilizing each query within the query log. More particularly, in an instance that the search engine 402 searches over the Internet, the signature generator 412 can maintain a query log and generate a hash of URLs that are located via each query within the query log. Thus, the system 400 is dynamically updated by each user who utilizes the search engine 402. For example, each query that has not been utilized previously is logged and stored together with objects that are located via the query. The system 400 further mitigates man-hours required to create and maintain a structure of objects, as user queries are employed to create such structure.

The system 400 also includes a crawler 414 that is employed by the search engine 402 to ensure that objects have not been removed and/or altered. Crawlers are programs that browse the data store 404 (e.g., the World Wide Web) in an automated and methodical manner. Crawlers keep a copy of all objects visited for later processing—for example by a search engine. Crawlers also utilize these objects to facilitate narrowing of a search. Search engines rely on crawlers to ensure that objects that are returned during a search are still existent on within the data store 404 and are current versions of such objects.

In accordance with one aspect of the present invention, the crawler 414 accesses the data store 404 and reviews queries that associated with the objects. The crawler 414 can determine frequency of utilization of queries associated with the objects in the data store, and visit objects associated with those queries with a higher frequency than objects that are associated with seldom-utilized queries. Thus, objects associated with frequently used queries can be given greater priority with respect to crawling than objects that are not returned when employing such queries. Furthermore, the crawler 414 can be associated with a utility component 416 that can perform a probabilistic based analysis in connection with actions taken by the crawler 414. For example, the utility component 416 can determine that a particular probability exists that one or more objects within the data store 404 have been altered/deleted since the last instance that the web crawler visited those objects.

Figure 5:
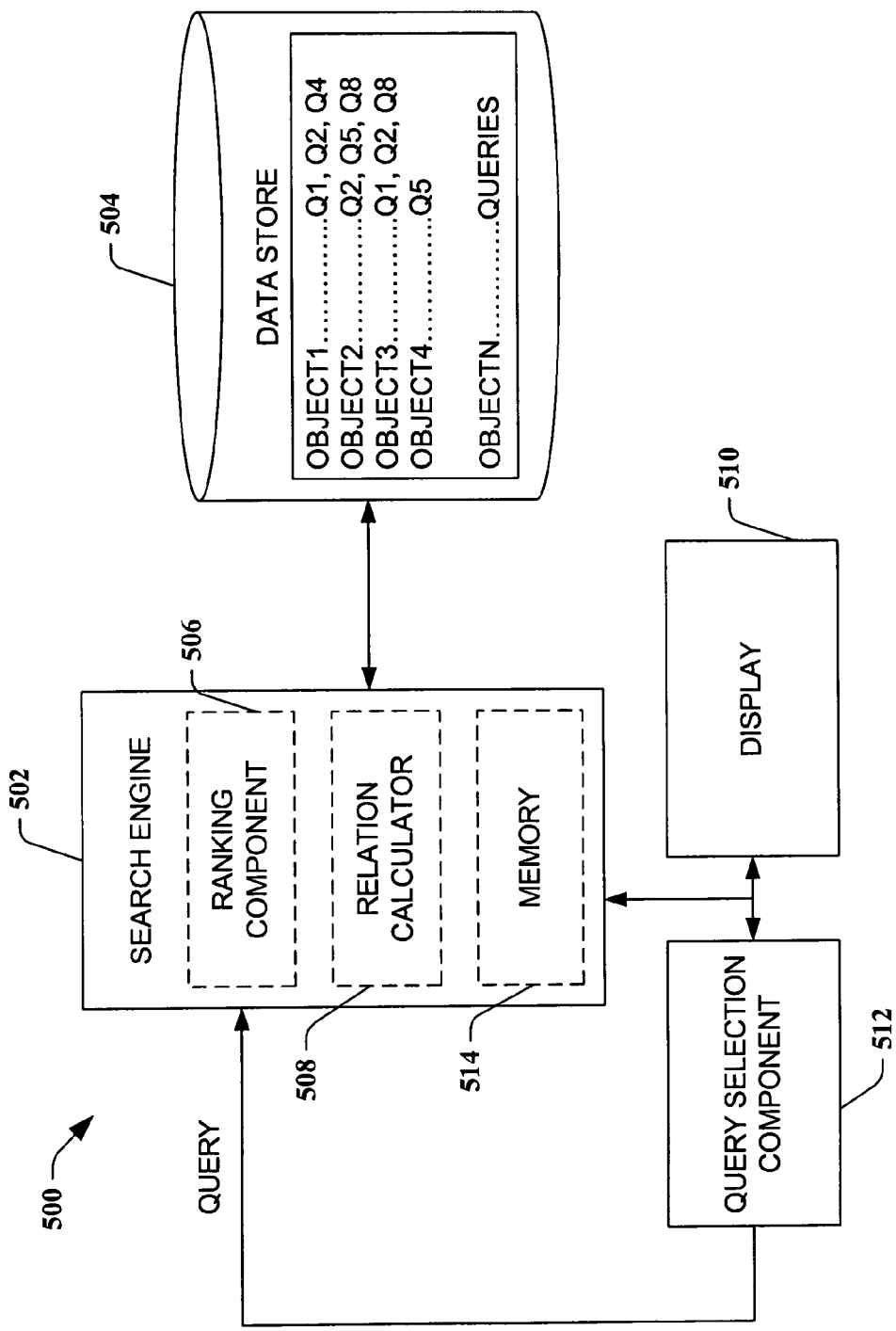
FIG. 5 is yet another block diagram of a system that facilitates determination of a search intent of a user in accordance with an aspect of the present invention.

Now referring to FIG. 5, a system 500 that enables a user to efficiently locate an object via a search engine is illustrated. The system 500 includes a search engine 502 that receives a query. The search engine 502 employs such query to locate objects within a data store 504 that are found to be related to the query. Each object within the data store 504 is associated with queries that were previously employed to locate such objects. For example, query Q5 was previously utilized by the search engine 502 to locate object4. The search engine 502 includes a ranking component 506 that ranks objects according to the query. Such ranking component 506 can employ any suitable ranking algorithm(s) in connection with locating and ranking objects within the data store 504 according to the query input into the search engine 502.

After objects have been located, queries associated with those objects are reviewed by a relation calculator 508. The relation calculator 508 locates queries that are both novel and related to the query that input into the search engine 502. For example, novel queries are associated with results that are not included within the result set associated with the input query. Related queries are associated with results that are related to the result set associated with the input query. For example, distance metrics can be employed together with a modified MMR scheme to locate novel yet related queries when compared to the input query. After such queries have been located, they can be delivered to the user via a display 510. Thereafter such queries can be selected by employing a query selection component 512. For instance, the queries can be displayed in the form of links, and the query selection component 512 facilitates selection of such links. Upon selecting a query, results associated with that query can be displayed to the user via the display 510. In accordance with one particular aspect of the present invention, the selected query can be input into the search engine 502, thereby allowing the user to "drill down" through queries that have greater specificity. For example, a user can be interested in a particular fly fishing lure. First, however, the user enters the under-specified query of "fly fishing" into the search engine 502. The relation calculator 508 retrieves the query "fly fishing lures" and returns such query to the user. The user thereafter selects the query "fly fishing lures", which is directed to the search engine 502. The relation calculator 508 can then return queries relating to particular lures, thus allowing the user to quickly obtain objects associated with the lure that such user intended to locate. Furthermore, the search engine 502 can include memory 514 that stores the user's previous searches. Thus, if a user selects a query and finds that the query returns objects that are not related to his intent, he can simply return to a previous level of search. For instance, if the user desires to locate an object associated with a particular fly fishing lure, but the selected query did not return such object, then the user can return to the previous query that was selected (e.g., "fly fishing lures").

Figure 6:
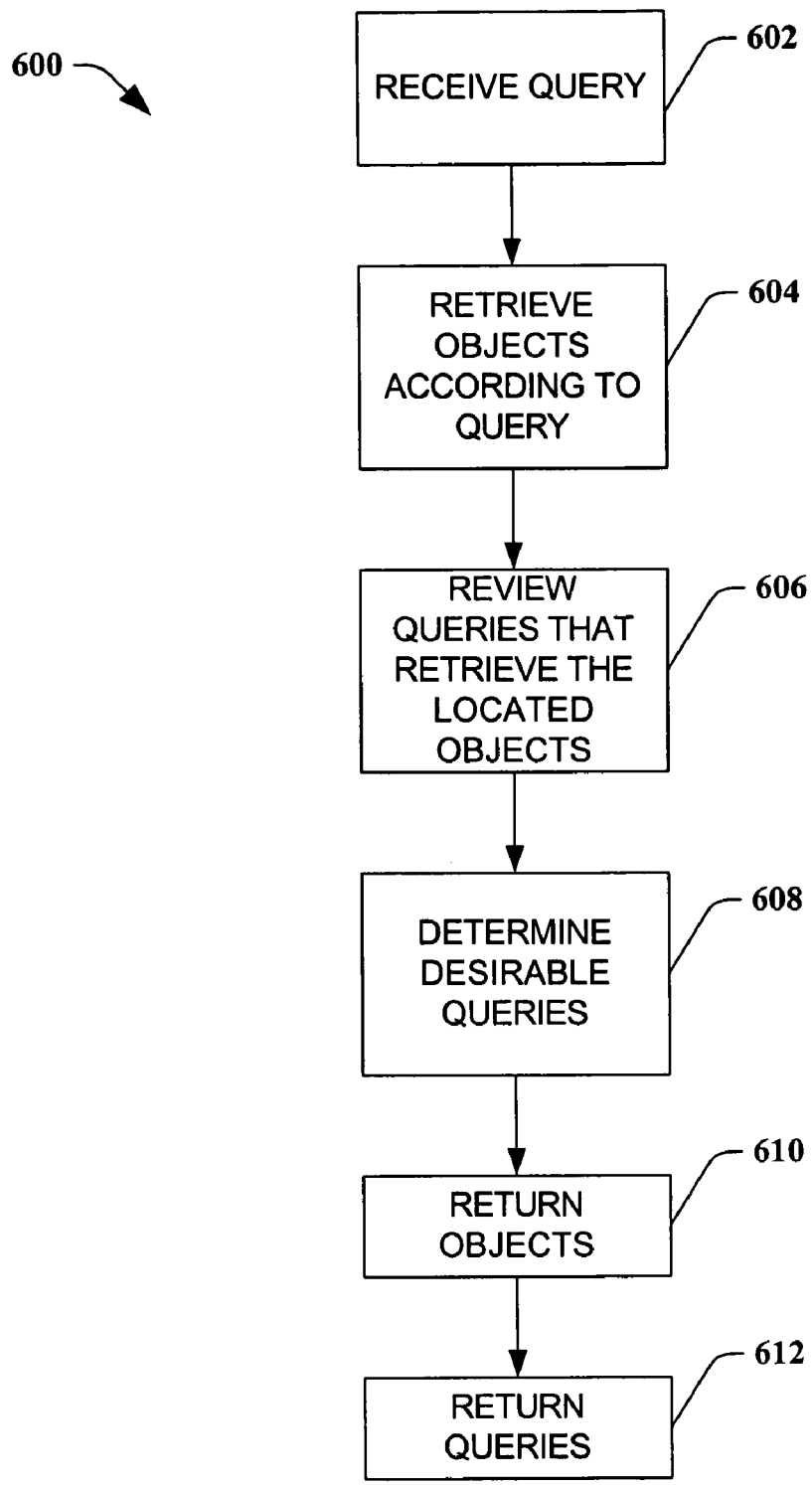
FIG. 6 is a representative flow diagram that illustrates a methodology for determining search intent of a user in accordance with an aspect of the present invention.

Referring now to FIG. 6, a methodology 600 for assisting a user with locating an object via a search engine is illustrated. While, for purposes of simplicity of explanation, the methodology 600 is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 602, a search engine receives a query. The query can be a textual query, a sound or series of sounds, a series of images and/or colors, or any other suitable query. Furthermore, the query can originate from a user, a program, etc. In accordance with one aspect of the present invention, the query is obtained via selecting such query within a browser or other suitable interface. At 604, the search engine retrieves objects according to the received query. Some underspecified queries can return thousands or even millions of objects (e.g., when searching the World Wide Web). Thus, in accordance with one aspect of the present invention, only a plurality of the most highly ranked documents located by the search engine are retrieved. The user is therefore not flooded with information that may not be relevant. Furthermore, it is to be understood that the term "objects" includes web pages, images, textual documents, sound files, or any other suitable object that can be searched for via a search engine. Moreover, the search can be employed over any suitable data store. For instance, the search can be employed over the World Wide Web, over a particular server, over a local hard drive, etc.

At 606, queries that were previously utilized to retrieve the objects returned at 604 are reviewed. For example, each object is associated with queries that have been employed to locate such object. Thus a substantial number of queries relating to each object can exist. Furthermore, each associated query will have a return set (e.g., a list of objects that are returned when employing such query). At 608, a determination is made regarding queries that are desirably returned to the user. Desirable queries are associated with result sets that are related to the result set corresponding to the received query, while such result sets are not substantially similar to the result set corresponding to the received query. Thus, desirable queries will retrieve both related and novel objects. In accordance with one aspect of the present invention, distance metrics can be employed in connection with a modified MMR scheme to determine desirable queries. More particularly, the algorithm $$\|q, q'\| = 1 - \frac{|R[q] \cap R[q']|}{|R[q] \cup R[q']|}$$

can be employed to determine distance metrics, where q is the received query, q' is a query that corresponds to an object returned via the query q, and R is a binary relation on Q×D. Q is a set of queries that was previously utilized by the search engine, and D is a set of objects within a data store (e.g., the World Wide Web, a server, . . . ) to be searched over. ||q,q'|| is a distance metric between queries q and q', and can be employed within the following modified MMR algorithm to locate desirable queries:

$$\underset{q'}{\operatorname{argmin}}\left[\lambda\|q, q'\| - (1-\lambda)\underset{q''}{\min}\|q', q''\|\right],$$

where λ is an interpolation factor that is established a priori, q is the initial query, and q'' represents queries that have previously been considered. Utilizing these algorithms in connection enables a search engine to determine most desirable queries to return to a user. It is to be understood, however, that any suitable algorithms can be employed in connection with locating queries that are related to a received query.

At 610, objects relating to the initial query are returned to the user. Act 610 is completed for instances that the user generated a query matching his/her intent. The objects can be ranked and returned as in conventional search engines. At 612, queries found to be related to the received query and novel with respect to the received query are returned to the user. For instance, a display can be employed to deliver both objects and queries to the user. Thereafter the user can select a returned query that most matches his/her intent.

Figure 7:
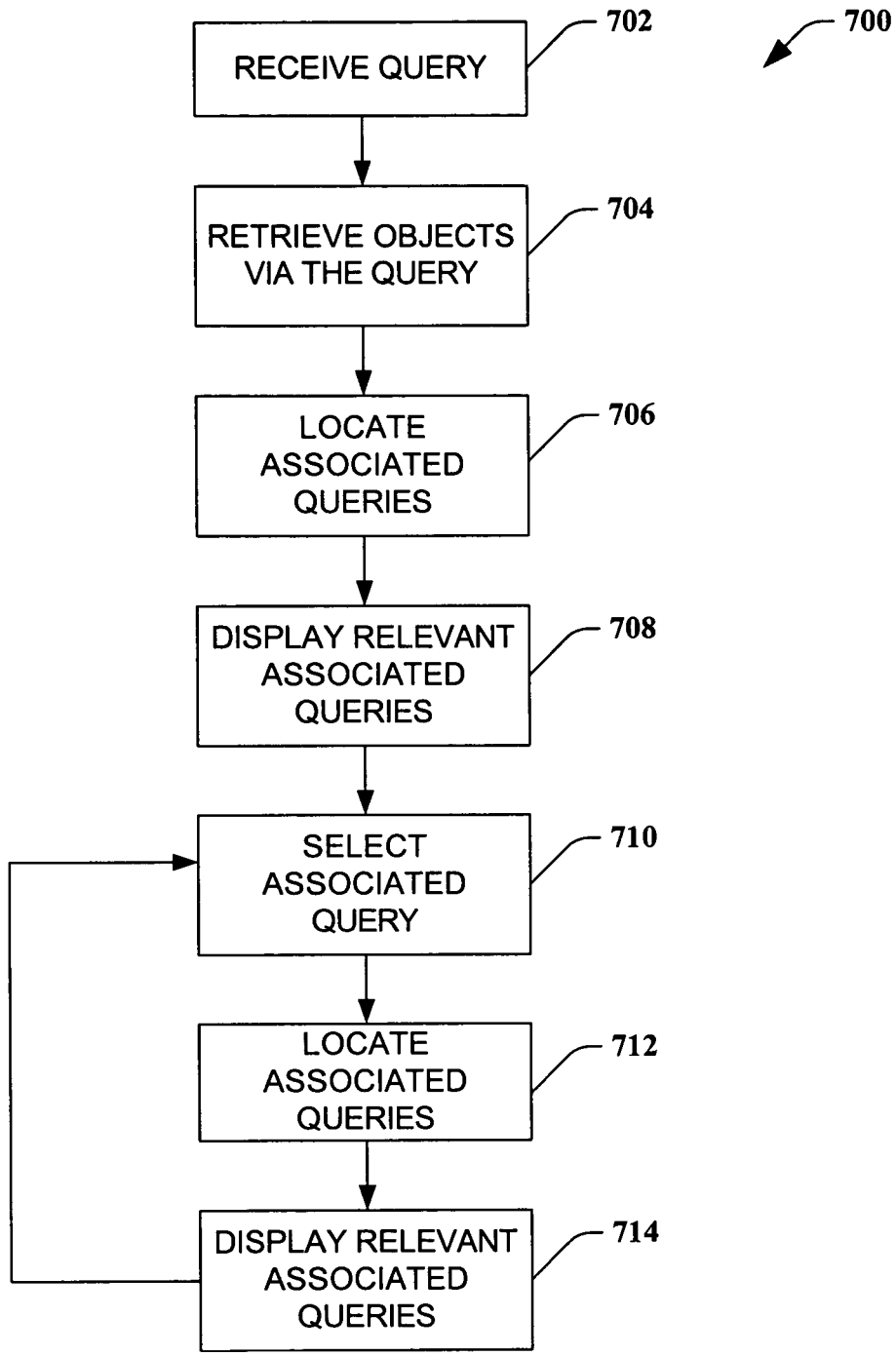
FIG. 7 is a representative flow diagram that illustrates a methodology for determining search intent of a user in accordance with an aspect of the present invention.

Now referring to FIG. 7, a methodology that enables a user to "drill down" with greater specificity in connection with a search is illustrated. At 702 a query is received, wherein the query can be generate by a user, computer program, or the like. At 704 a search is performed over a data store and objects are retrieved based at least in part upon the received query. In accordance with one aspect of the present invention, the objects in the data store can be associated with queries that were previously employed to locate such objects. For example, if a user previously utilized the query "fly fishing in Alaska" and an object related thereto was retrieved based upon such query, the object would be associated with such query as well as other queries that located the object. At 706, queries that are associated with the objects are located. Thus, if the query "fly fishing" were the received query at 702, and such query returned the same object that the query "fly fishing in Alaska" returned, the "fly fishing in Alaska" would be an associated query. All such associated queries are located at 706.

At 708, relevant associated queries are retrieved and displayed to the user. Relevant queries should be both related to the received query as well as novel with respect to the received query. More particularly, each associated query will have a corresponding result set (e.g., a collection of objects that are returned when such query is employed). The result sets of the corresponding queries should be related but not substantially similar to the result set corresponding to the received query. Furthermore, result sets of associated queries should be related but not substantially similar to the result sets corresponding to disparate associated queries. This ensures that each returned and displayed query will be associated with objects that are not duplicates but are nevertheless related. In accordance with one aspect of the present invention, distance metrics together with a modified MMR scheme can be utilized in connection with determining relevant associated queries.

At 710, the user selects one of the associated queries, wherein such associated query better represents the user's actual intent than the received query at 702. Thus, the user will be provided with objects that are more relevant to that intent than objects returned when utilizing the received query. At 712, queries associated with the selected query are located. For instance, object(s) located by the selected query will be associated with disparate queries that were previously employed to locate such object(s). Thereafter at 714 relevant queries that are associated with the selected query are displayed. If filtering techniques are employed, then the relevant queries can be more specified than the selected query (e.g., queries shorter than the selected query can be removed from consideration). Thereafter the user can select another query that better represents his intent at 710 until an optimal query is located. Thus, the user can continue to "drill down" through queries until a best query is located. The methodology 700 is also useful in situations that a user is simply browsing. For example, the user can be interested in fly fishing but does not have a specific intent with respect to fly fishing. The user can enter the general query "fly fishing" into a search engine, and a plurality of related queries can be presented. The associated queries can assist the user in a particular browsing direction.

Figure 8:
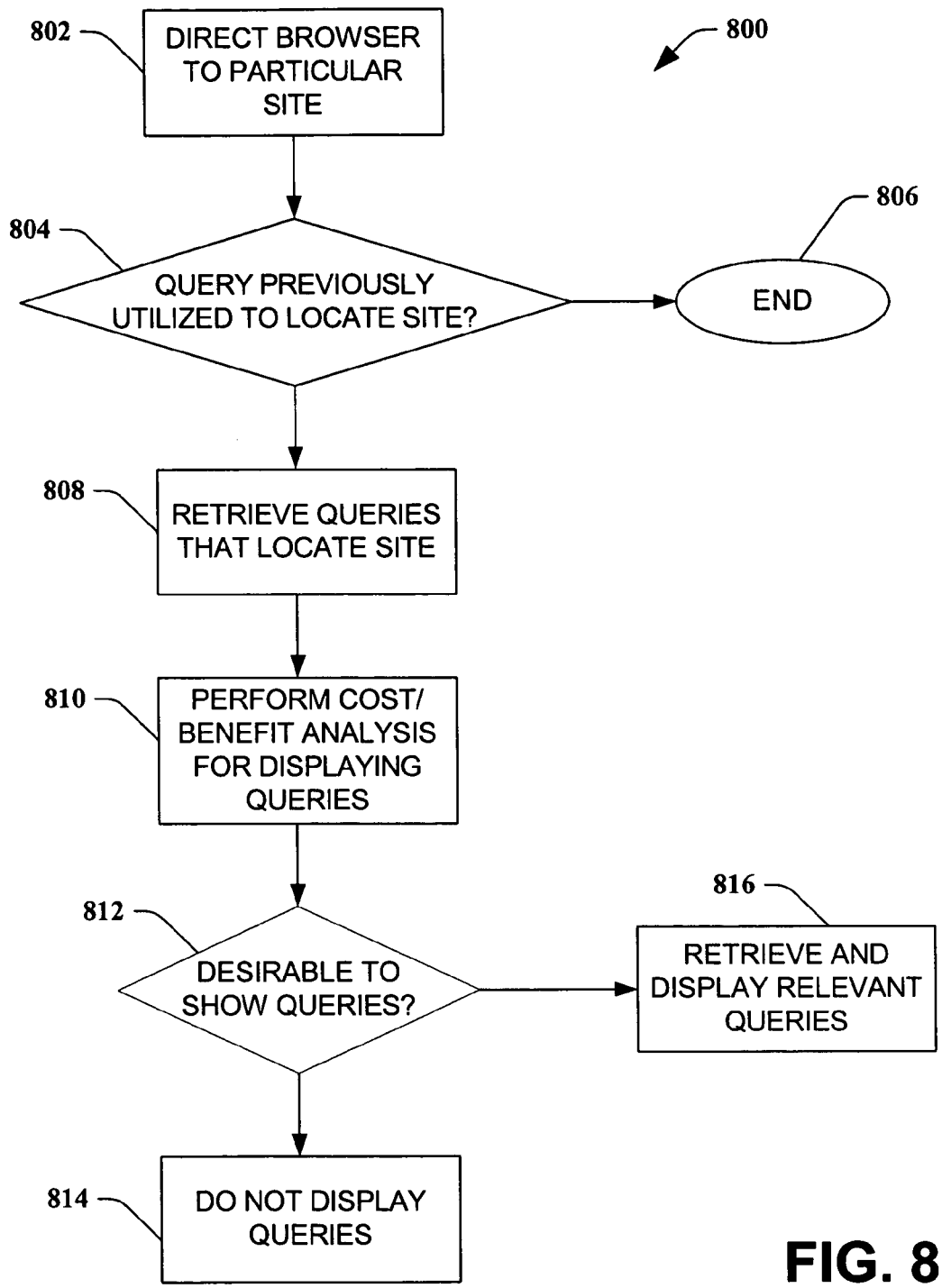
FIG. 8 is a representative flow diagram that illustrates a methodology for determining search intent of a user in accordance with an aspect of the present invention.

Turning now to FIG. 8, a methodology 800 for delivering queries that are related to a particular object is illustrated. At 802 a browser is directed to a particular site. For instance, the browser can be directed via entering a URL into an address bar of such browser. Alternatively, a user can select the site after utilizing a search engine to locate such site. At 804 a determination is made regarding whether any queries have ever been employed to locate such site. Such information can, for instance, be located in a data store that is accessible to the browser. If no queries have ever been employed to locate the site, then the methodology ends at 806. Otherwise, queries that have been previously utilized to locate the site are retrieved at 808. At 810, a cost/benefit analysis is performed to determine whether it may be desirable to display queries to the user while such user is reviewing the chosen site. For example, it may not be desirable to display queries together with a site that requires substantial screen space for optimal viewing. Furthermore, user history might indicate that the user does not desire queries to be shown together with a chosen site.

At 812, a determination is made regarding whether it is desirable to show queries according to the cost/benefit analysis. If it is not desirable, the queries are not displayed at 814 and the user is provided only with the selected site. If queries are desirably displayed, then at 816 relevant queries are retrieved and displayed to the user at 816. For example, the query with fewest words can be selected as a query, and objects returned within that query can be employed to locate associated queries. More particularly, the user can type in the URL for an Alaskan fly fishing site. Thereafter, a plurality of queries that were previously employed to locate such site can be reviewed. The shortest query (e.g., "fly fishing") can be employed as a base query, and all sites found by such query can be reviewed. Thereafter queries that were previously employed to find such sites can be considered, and queries related to the base query can be displayed to the user. Thus, the user can be provided with a plurality of queries that are related to the site currently being viewed. This can assist the user in browsing for other sites that may contain relevant information.

Figure 9:
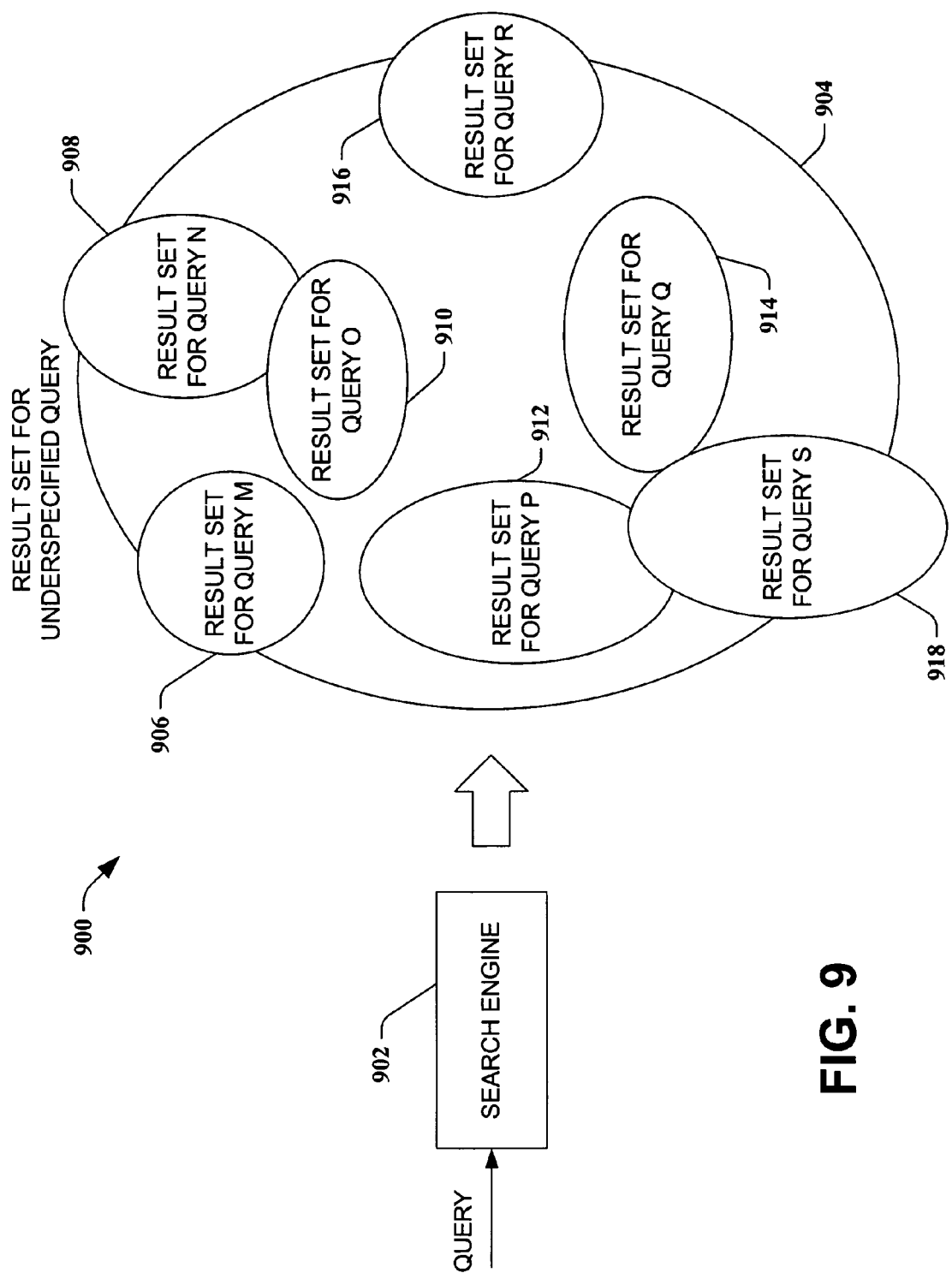
FIG. 9 is an exemplary partitioning of a result set associated with a query in accordance with an aspect of the present invention.

Referring now to FIG. 9, an exemplary partitioning 900 of a result set associated with a query according to previous queries is illustrated. A search engine 902 receives an underspecified query and searches over a collection of objects according to such query. As depicted in this figure, an underspecified query can result in a return of a wide-range of objects that may or may not be related to a user's intent (e.g., a wide range of subjects can relate to the query). Furthermore, underspecified queries can result in a return of a significant number of documents when utilizing conventional search engines. For instance, when entered into one particular conventional search engine that searches the World Wide Web, the query "fly fishing" results in the return of more than 3,000,000 objects. The result set can, however, be partitioned into more specific result sets when utilizing previously employed queries (e.g., previous users utilized more specific queries than the current user). These result sets are not only more particular to a topic, but they typically include substantially fewer objects. In this particular partitioning 900, a result set 904 is created via utilizing the underspecified query and the search engine 902. Utilizing the present invention, however, the result set can be partitioned into a plurality of more specific result sets 906–928. Specifically, a result set 906 is generated when utilizing query M, a result set 908 is generated when the search engine 902 utilizes query M, a result set 910 is generated when utilizing query O, a result set 912 is created when the search engine 902 utilizes query P, a result set 914 is generated by employing query Q, a result set 916 is created when utilizing query R, and a result set 918 is generated when the search engine 902 employs query S to effectuate a search over a data store containing objects in the result set 918. Thus, a user is provided with these queries that can assist the user in focusing a search to the user's intent.

Furthermore, it is to be understood that the result sets 906–918 can themselves be partitioned according to previous user queries that are more particular. Also, it can be seen that result sets created via employing previous queries can be wholly included within the initial result set 904, or they can lie partially outside the initial result set 904. For example, the result set 906 for query M lies partially outside the initial result set 904, while the result set 910 for query O is entirely within the initial result set. Furthermore, result sets can partially overlap each other or be fully contained by another result set. For instance, result sets 908 and 910 partially overlap.

Figure 10:
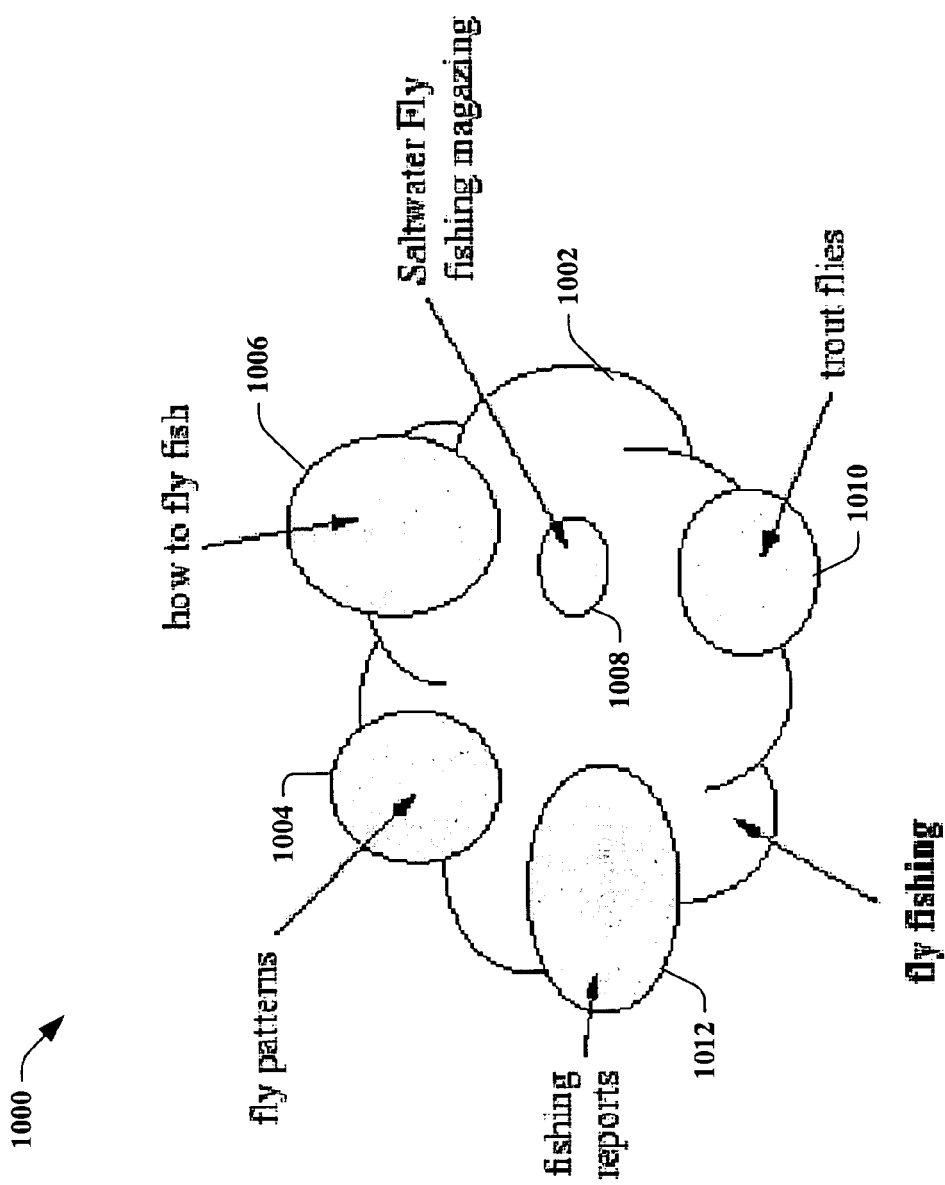
FIG. 10 is another exemplary partitioning of a result set associated with a query in accordance with an aspect of the present invention.

Now regarding FIG. 10, a particular partitioning 1000 of a result set 1002 is illustrated. The result set 1002 has been generated based upon the query "fly fishing." As can be seen, such query results in a broad array of subjects. Utilizing the present invention, however, the result set can be partitioned into a plurality of more specific result sets that are related to fly fishing. For instance, the query "fly patterns" will produce a result set 1004, the query "how to fly fish" will produce a result set 1006, the query "Saltwater Fly fishing magazine" will produce a result set 1008, a query "trout flies" will produce a result set 1010, and a query "fishing reports" will produce a result set 1012. Thus, a user who enters the query "fly fishing" into a search engine can be provided with the aforementioned queries, wherein one of the queries may better represent what the user is intending to find than the underspecified query "fly fishing." The present invention can retrieve these queries by maintaining a correlation between objects and queries utilized to retrieve those objects. Thus, objects retrieved utilizing the query "fly fishing" may also have been retrieved when more specific queries were utilized. Thus, a level of relatedness between these previous queries and the current query can be ascertained, and highly related queries that include novel objects can be returned to the user.

Figure 11:
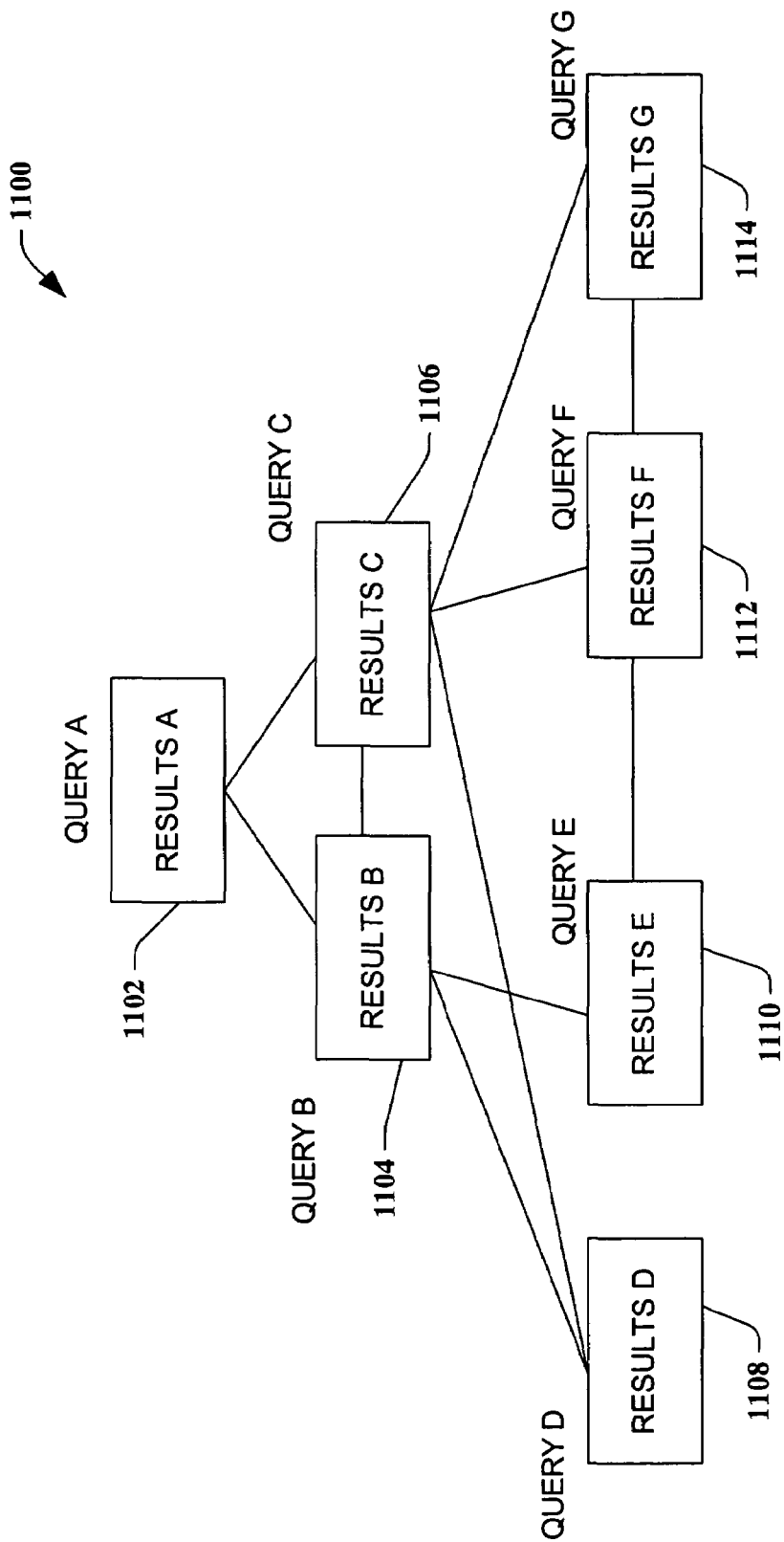
FIG. 11 is an exemplary arrangement of result sets in accordance with an aspect of the present invention.

Now turning to FIG. 11, an exemplary arrangement 1100 of result sets according to disparate queries is illustrated to facilitate a better understanding of one or more aspects of the present invention. The arrangement includes result set A 1102 that are retrieved by employing an underspecified query A in connection with a search engine. For example, result set A 1102 can include a threshold number of highly ranked objects according to search engine ranking algorithm(s). This limited number, however, can cover a wide subject matter within the query. For instance, if query A is "fly fishing", the top twenty results can cover a wide range of matter within the subject of fly fishing. Queries B and C, however, are more specific and thus they can be employed to retrieve result sets B 1104 and C 1106 that are likewise more specific. Thus, for instance, a user can initially enter query A and be delivered at least a portion of result set A 1102. The user can also be provided with queries B and C, which may be more specific and better represent the user's intent. The user can choose to employ query B and/or query C to obtain results will facilitate locating a desired object more quickly than utilizing query A. Furthermore, query B and C can also be related to one another, causing result set B 1104 and result set C 1106 to at least partially overlap.

As illustrated in this figure, result set B 1104 can be further partitioned by utilizing queries D and E, and result set C can be further partitioned by utilizing queries D, F, and G. These queries in turn generate result set D 1108, result set E 1110, result set F 1112, and result set G 1114. These result sets 1108–1114 are partitions of result sets B 1104 and result set C 1106, and are thus partitions of result set A 1102. Furthermore, result set E 1110 and result set F 1112 can at least partially overlap, and result set F 1112 and result set G 1114 can at least partially overlap. In one example, a user can enter query A and obtain result set A 1102 that includes objects not highly related to the user's intent. Queries B and C are provided, and upon viewing such queries the user can determine that one of them better represents the user's intent. Thereafter, the user can select query B and obtain result set B 1104, as well as be provided with queries D and E, which may better still represent the user's intent. If query E is chosen, the result set E 1110 can be displayed to the user, which contains objects that are highly related to the intent of the user.

Figure 12:
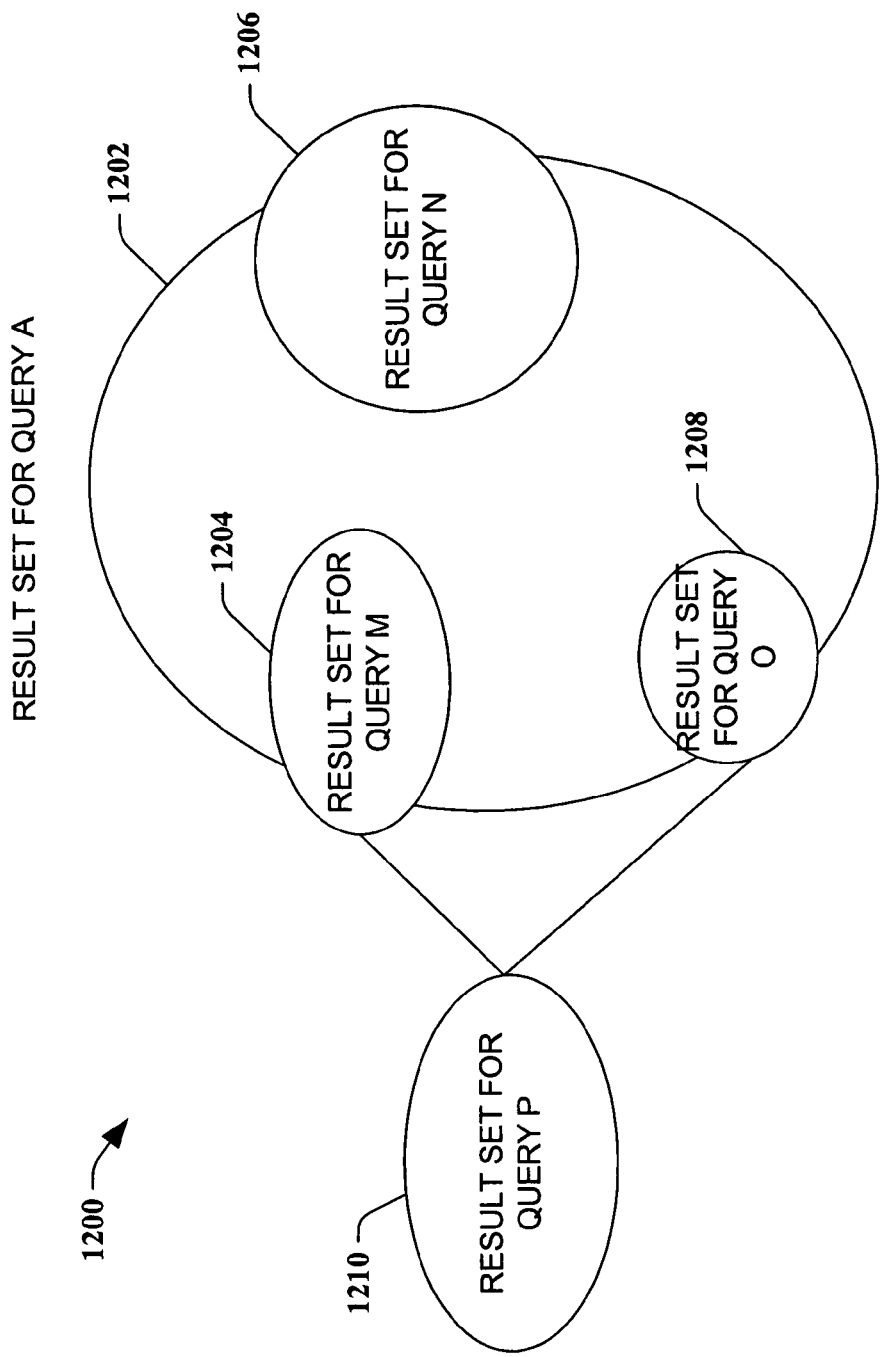
FIG. 12 illustrates a manner in which the present invention can retrieve a query that is tangentially related to a user search query in accordance with an aspect of the present invention.

Turning now to FIG. 12, another exemplary utilization 1200 of the present invention is illustrated. A result set 1202 for an underspecified query A is generated when a search engine employs the underspecified query A in connection with a search. The present invention facilitates partitioning the result set into a plurality of more specific result sets based upon previous queries utilized to locate objects within the result sets. For instance, a result set 1204 can be created when a previous query M is employed in connection with a search engine, a result set 1206 can be generated when a previous query N is utilized for a search, and result set 1208 can be created when a previous query O is employed for searching a collection of objects. For instance, query A can be "fly fishing", query M can be "how to fly fish", query N can be "fly fishing reports", and query O can be "trout flies". All of these queries are related to fly fishing, and can be utilized to assist a user in locating a particular object. These result sets 1204–1208 can also be employed to locate a query P that is tangentially related to fly fishing. This can be accomplished, for example, by reviewing inlinks and outlinks from objects within the return sets 1204–1208. In this particular example, objects within result set 1204 and result set 1208 have inlinks and/or outlinks to a substantial number of objects within a result set 1210 for query P. For instance, as before query M can be "how to fly fish" and query O can be "trout flies." A plurality of objects within the result sets 1204 and 1208 can include outlinks to saltwater fishing objects, which are only tangentially related to fly fishing. A substantial number of these objects can be found utilizing a single query P (e.g., "saltwater fishing on the East Coast"). The present invention contemplates reviewing inlinks and/or outlinks within a partitioned result set to present the user with one or more queries that are tangentially related to the initial query A. This can be beneficial when a user does not have a particular intent, but is simply browsing over a collection of objects until one such object is found to be of interest.

Figure 13:
FIG. 13 illustrates one exemplary implementation of the present invention.

Now turning to FIG. 13, an exemplary implementation 1300 of the subject invention is illustrated. The initial underspecified query 1302 in the implementation 1300 is displayed across the top as "fly fishing." Directly beneath the query is a listing of queries 1304 that are related to the initial query of "fly fishing" but do not return substantially similar results (e.g., the ten most highly ranked results from the query "fly fishing" and the ten most highly ranked results returned when utilizing the queries 1304 are not substantially similar). These queries 1304 are hyperlinked, wherein selection of one of the queries directs the user to a disparate portion of a return page. Moreover, selection of one of the queries can result in an entirely new search with disparate related queries located and displayed to a user. Below the listing of queries 1304 are an integer number of results 1306 from searching with the query "fly fishing." These results are returned for instances that the user knows a particular object can be found by employing the query "fly fishing."

After the listing of results, queries 1308 are displayed with a +/− toggle that can expand or collapse such queries to display results. In this exemplary implementation, the query "fly fishing equipment" has been expanded, and a plurality of results 1310 found when utilizing such query are listed. For instance, a threshold number of most highly ranked results can be returned to the user, thereby mitigating instances that a user is required to page through numerous results to find a desirable object.

Figure 14:
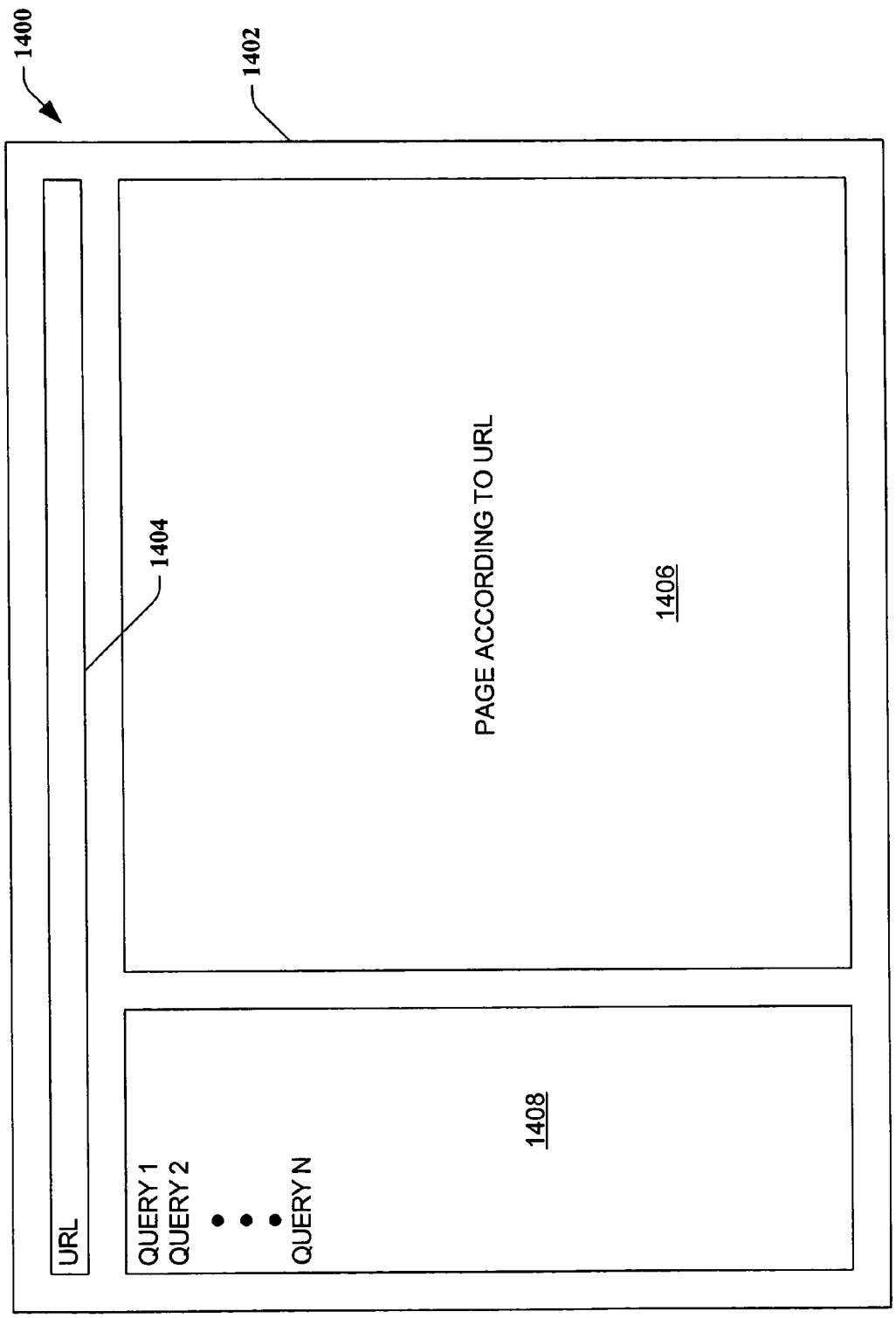
FIG. 14 illustrates another exemplary implementation of the present invention.

Now referring to FIG. 14, another exemplary implementation 1400 of the present invention is illustrated. A browser 1402 is employed that contains an address bar 1404 that can be used to insert a URL of desired site to visit on the World Wide Web. The browser can be directed to a page via entering the address in the address bar 1404, selecting a link from a disparate site, utilizing a search engine, etc. The browser 1402 includes a display region 1406 that displays a site according to the URL. The browser 1402 also includes a display region 1408 that can be employed to display queries that were previously utilized to locate such site. For instance, a shortest query that can be used to retrieve the site can be employed as a base query, and related queries that also can be employed to receive the site can be determined based at least in part upon the base query. Thus, if a user desires information that is similar to what is shown on the display region 1406, such user can simply select a query from the display region 1408 to locate such information.

Figure 15:
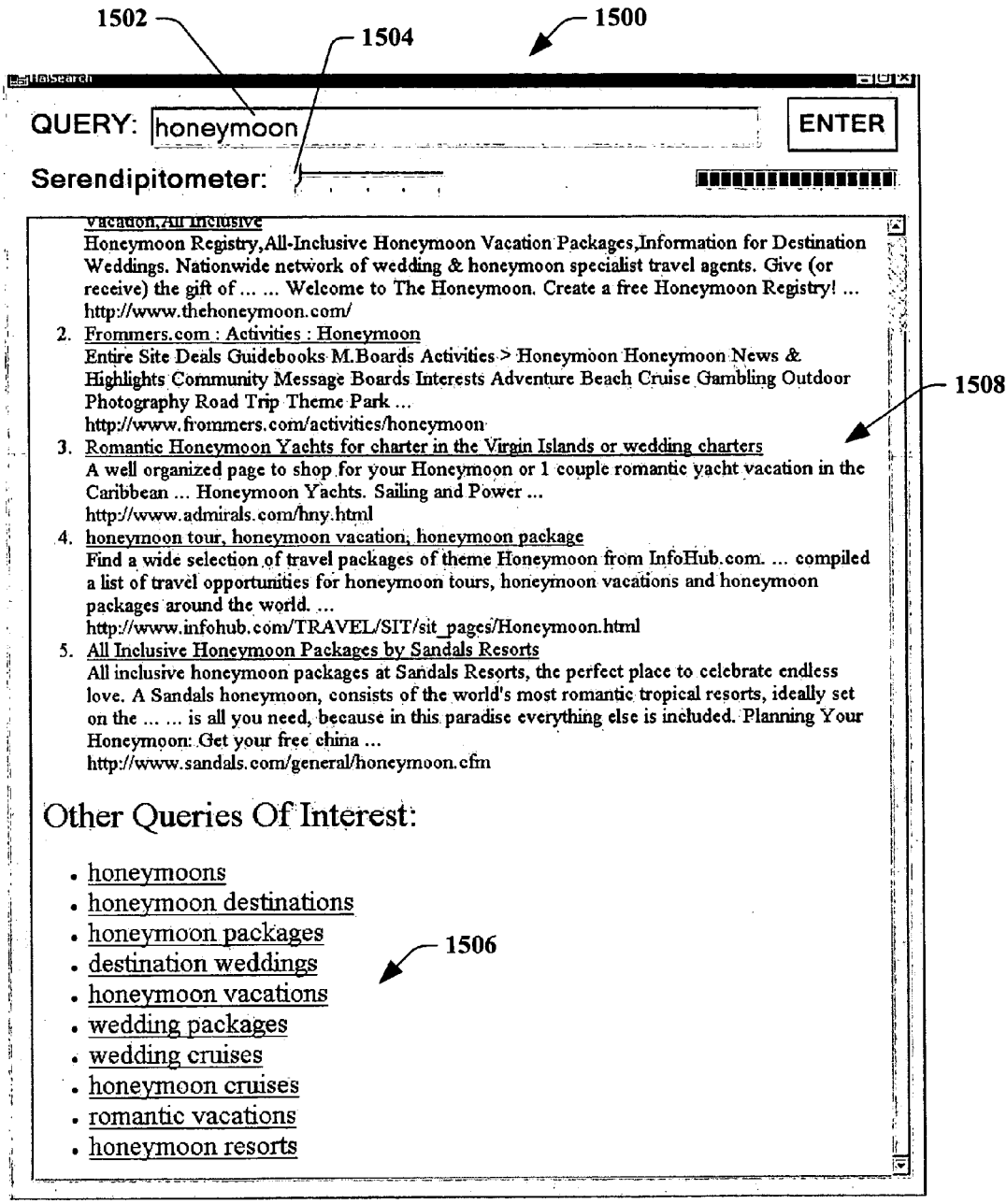
FIG. 15 illustrates yet another exemplary implementation of the present invention.
Figure 16:
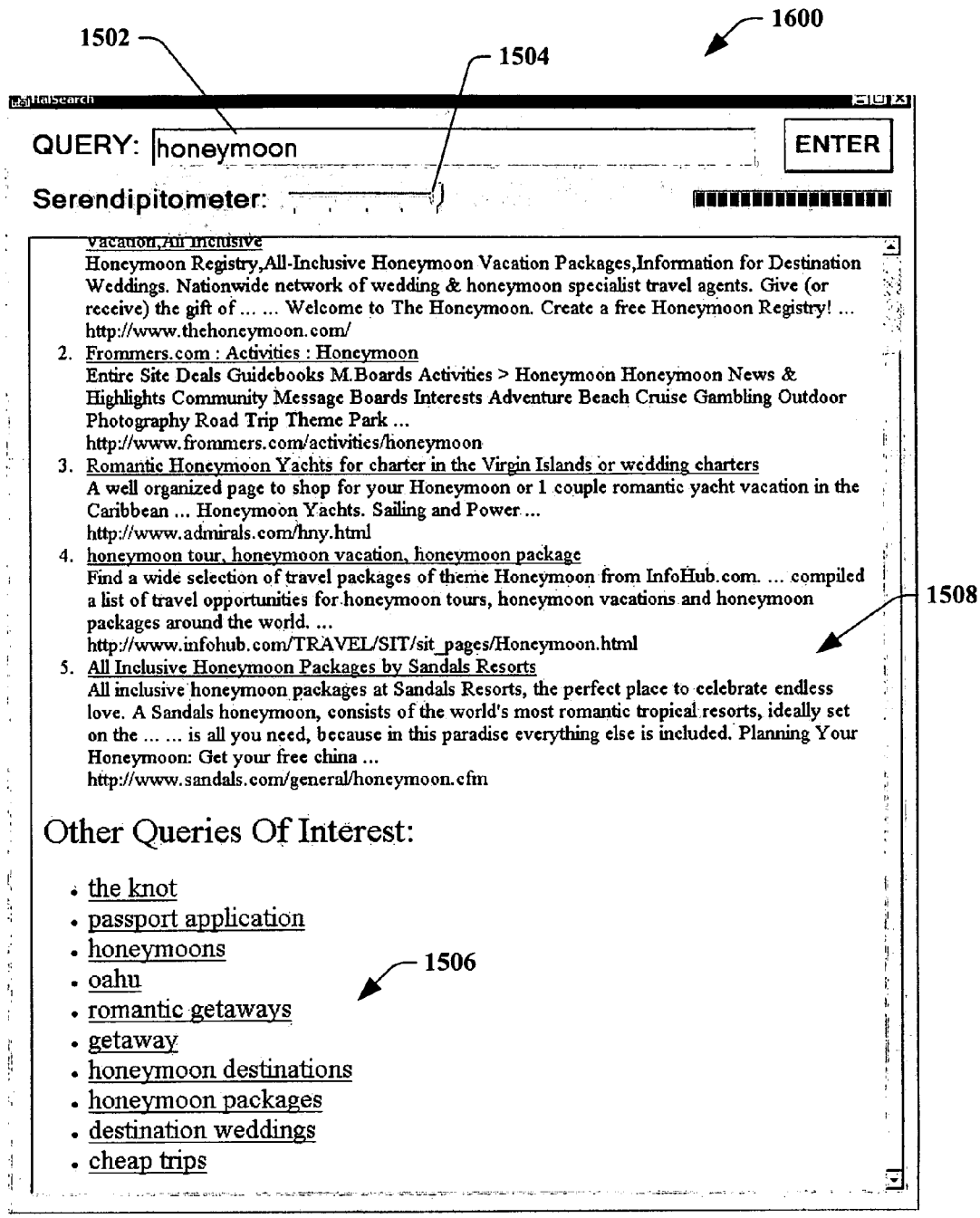
FIG. 16 illustrates still yet another exemplary implementation of the present invention.

Now referring to FIGS. 15 and 16, exemplary implementations of the present invention are illustrated, wherein such exemplary implementations allow a user to control an amount of overlap required between return sets of an initial query and related queries. Such implementations enable a user to customize a search engine by controlling a level of serendipity between an initial query and retrieved queries. More particularly, a requirement of substantial overlap between return sets of the initial query and previous queries will result in retrieval of similar queries, while requiring less overlap between such return sets will result in retrieval of more serendipitously related queries. Turning specifically to FIG. 15, one particular exemplary implementation 1500 of the present invention includes a query box 1502, wherein a user has entered the query "honeymoon". A slide bar 1504 entitled "serendipitometer" can be employed by the user to control an amount of overlap required between return sets of the initial query of "honeymoon" and previous queries. For example, in this exemplary implementation the slide bar 1504 is positioned to require a substantial amount of overlap between the return set of the query "honeymoon" and previous queries (e.g., less serendipitous queries will be returned to the user). More particularly, the initial query "honeymoon" results in a plurality of similar queries 1506, such as "honeymoons", "honeymoon destinations", "honeymoon packages", "destination weddings", "honeymoon vacations", "wedding packages", "wedding cruises", "honeymoon cruises", "romantic vacations", and "honeymoon resorts." As can be determined by reviewing such queries, these are generally more specific to the initial query of "honeymoon" and can be utilized by a user to "drill down" until a query that reflects his/her intent is located. Furthermore, a plurality of highly rated objects 1508 located via employing the query "honeymoon" are returned to the user for instances that the initial query returned a desired object.

Now turning briefly to FIG. 16, a disparate exemplary implementation 1600 of the present invention is illustrated. The query of "honeymoon" is again entered into the query box 1502, but the slide bar 1504 has been positioned to require less overlap between return sets of the initial query ("honeymoon") and previous queries. This allows the plurality of queries 1504 to be serendipitously related to the initial query (e.g., queries that may provide useful information to a user that such user did not specifically intend to find). In this exemplary embodiment, returned queries such as "passport applications", "oahu", and "cheap trips" may not be directly related to the user, but such user may find such information useful. For instance, the user may desire to go overseas when reviewing honeymoon destinations, but not yet thought of passport applications. Thus, the present invention can be utilized to assist a user in finding information that is tangentially related to the user's intent. While the exemplary implementations 1500 (FIG. 15) and 1600 utilize the slide bar 1504, it is to be understood that any suitable mechanisms can be employed that enable a user to vary a level of overlap required between return sets of an initial query and previous queries. Furthermore, a level of required overlap between return sets of an initial query and previous queries can be automatically determined via artificial intelligence component(s) via watching a user over time and learning types of queries that users desire given particular states and/or contexts.

Figure 17:
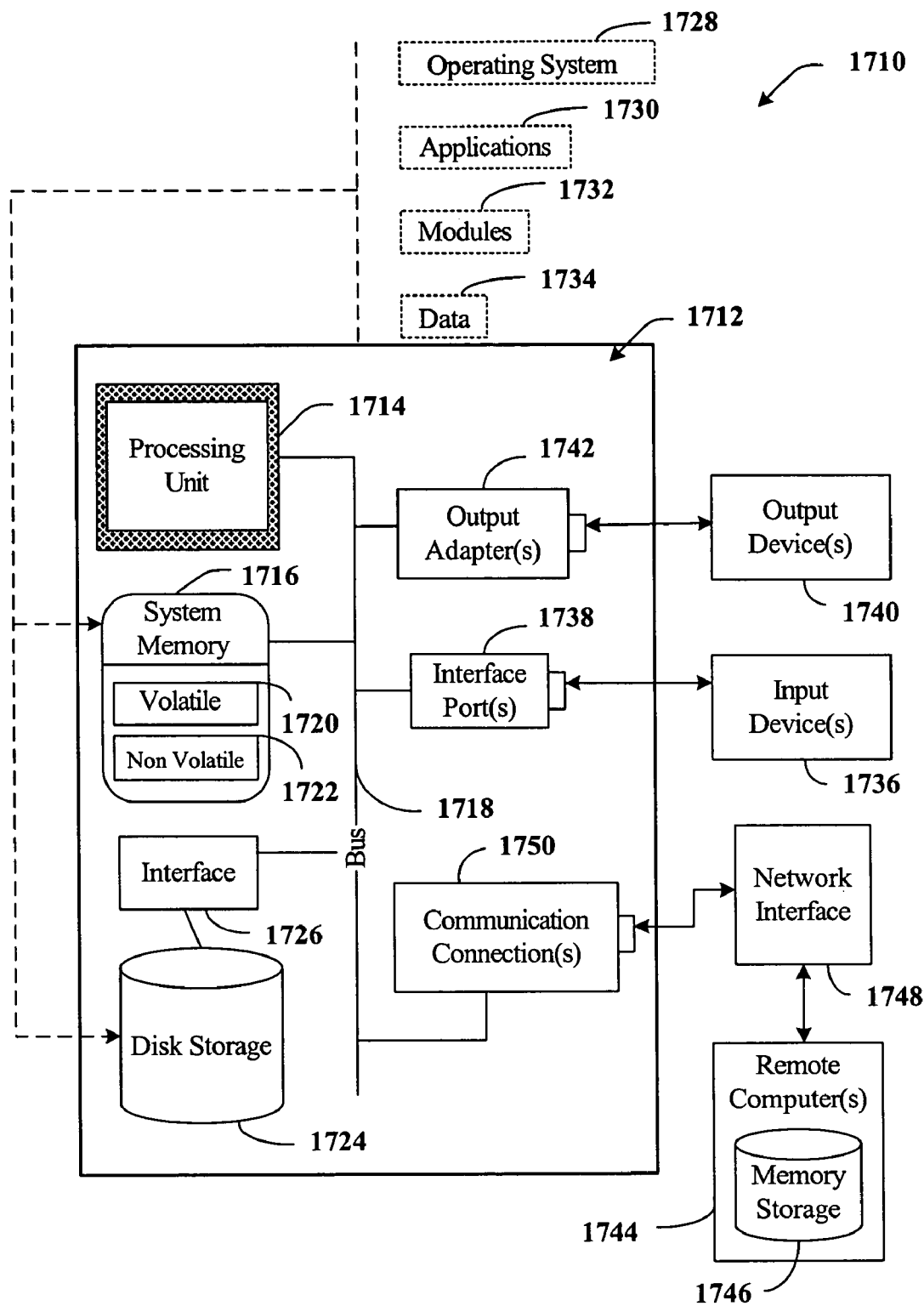
FIG. 17 illustrates an example-operating environment in which the present invention can function.

With reference to FIG. 17, an exemplary environment 1710 for implementing various aspects of the invention includes a computer 1712. The computer 1712 can be any suitable computing device (e.g., a personal digital assistant, laptop computer, server, desktop computer, . . . ) The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable ROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/nonremovable, volatile/nonvolatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the present invention can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapter 1742 is provided to illustrate that there are some output devices 1740 like monitors, speakers, and printers among other output devices 1740 that require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

Figure 18:
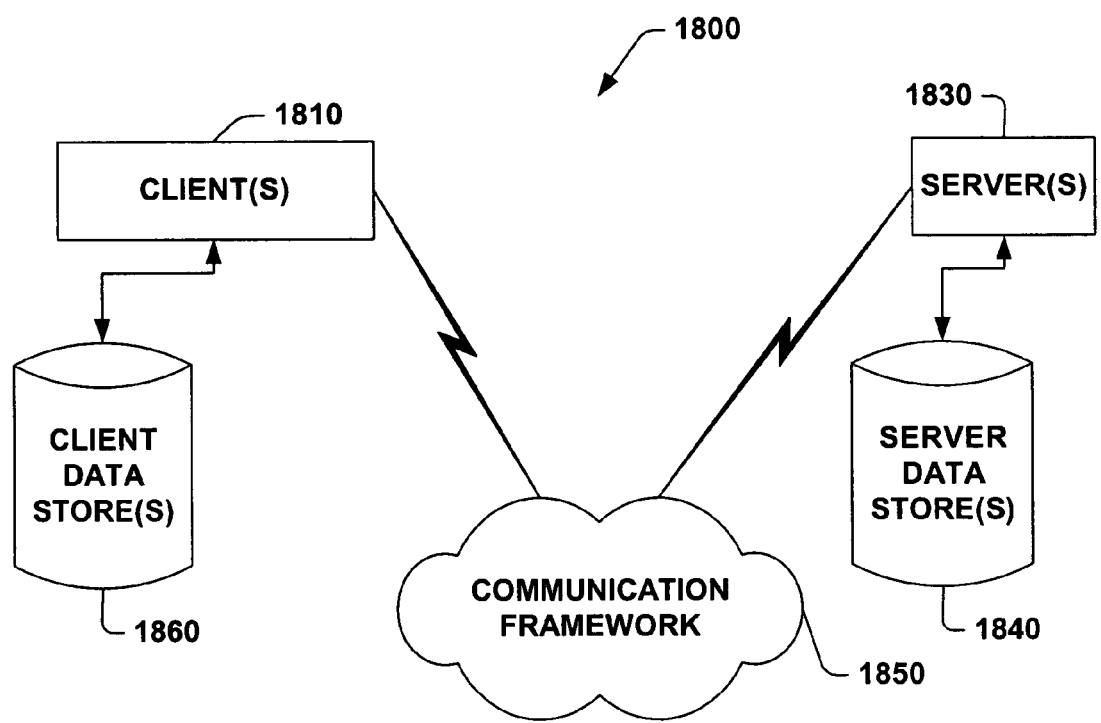
FIG. 18 illustrates another example operating environment in which the present invention can function.

FIG. 18 is a schematic block diagram of a sample-computing environment 1800 with which the present invention can interact. The system 1800 includes one or more client(s) 1810. The client(s) 1810 can be hardware and/or software (e.g., threads, processes, computing devices). The system 1800 also includes one or more server(s) 1830. The server(s) 1830 can also be hardware and/or software (e.g., threads, processes, computing devices). The servers 1830 can house threads to perform transformations by employing the present invention, for example. One possible communication between a client 1810 and a server 1830 may be in the form of a data packet adapted to be transmitted between two or more computer processes. The system 1800 includes a communication framework 1850 that can be employed to facilitate communications between the client(s) 1810 and the server(s) 1830. The client(s) 1810 are operably connected to one or more client data store(s) 1860 that can be employed to store information local to the client(s) 1810. Similarly, the server(s) 1830 are operably connected to one or more server data store(s) 1840 that can be employed to store information local to the servers 1830.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates determining an intent of a user, comprising:
    a search component that identifies a result set for a user search query;
    a data store that maintains objects, the data store correlates the objects with queries that were previously employed to retrieve the objects;
    a user intent discovery component that determines a set of potential search areas based at least in part upon the result set of the user search query and results of previous queries;
    a query relation calculator that determines a level of relatedness between the user search query and the previous queries, the query relation calculator selects previous queries to display to the user based at least in part upon the calculated level of relatedness;
    wherein a level of relation between the previous queries and the user search query is obtained at least in part by determining distance metrics between the previous queries and the user search query; and
    wherein the distance metrics are determined by utilizing the algorithm $$\|q, q'\| = 1 - \frac{|R[q] \cap R[q']|}{|R[q] \cup R[q']|}$$

where $\|q,q'\|$ is a distance metric between the user search query q and one or more previous queries q', and R is a binary relation on Q×D, wherein Q is a set of queries previously employed by the search component and D is a set of objects within a data store that is searched over by the search component.

2. The system of claim 1, wherein the previous queries are obtained via reviewing the result set of the user search query.

3. The system of claim 1, wherein the level of relation between the previous queries and the user search query is obtained at least in part by utilizing a modified maximal marginal relevance scheme.

4. The system of claim 3, the maximal marginal relevance scheme employs the algorithm $$\underset{q'}{\mathrm{argmin}}\Big[\lambda\|q,q'\| - (1-\lambda)\underset{q''}{\mathrm{min}}\|q',q''\|\Big],$$

where $\lambda$ is an interpolation factor that is established a priori, and q" represents one or more previous queries that have already been considered prior to the consideration of q'.

5. The system of claim 1, further comprising a filter component that limits a number of objects within the result set of the user search query.

6. The system of claim 1, further comprising a filter component that removes previous queries that have fewer words than the user search query from consideration.

7. The system of claim 1, further comprising a filter component that removes previous queries that include predefined strings from consideration.

8. The system of claim 1, further comprising a filter component that removes previous queries that are lexically similar to the user search query from consideration.

9. The system of claim 1, further comprising a filter component that removes previous queries that comprise characters that are not printable ASCII characters from consideration.

10. The system of claim 1, further comprising a feedback component that facilitates customization of the system according to user preference.

11. The system of claim 1, further comprising an artificial intelligence component that makes inferences with respect to at least one of selection and arrangement of the potential search areas according to one or more of user state, user history, user context, and contextual information.

12. The system of claim 11, the contextual information comprising one or more of temperature, time of day, location, and day of a week.

13. The system of claim 1 further comprising a user profile, the user profile comprising information relating to at least one of selection and arrangement of the potential search areas.

14. The system of claim 13, the user profile being portable.

15. A system that facilitates determining user intent, comprising:
  a search engine that receives a user search query, the search engine searches over objects within a data store according to the user search query, the objects being associated with queries previously employed to locate the objects; and
  a query relation calculator that determines a level of relatedness between the user search query and the previous queries, the query relation calculator selects previous queries to display to the user based at least in part upon the calculated level of relatedness;
  wherein the level of relatedness is based at least in part upon distance metrics between the user search query and the previous queries; and
  wherein the distance metrics are determined by utilizing the algorithm $$\|q,q'\| = 1 - \frac{|R[q] \cap R[q']|}{|R[q] \cup R[q']|},$$

where $\|q,q'\|$ is a distance metric between the user search query q and one or more previous queries q', and R is a binary relation on Q×D, wherein Q is a set of queries previously employed by the search engine and D is a set of objects within a data store that is searched over by the search engine.

16. The system of claim 15, wherein the level of relatedness between the previous queries and the user search query is obtained at least in part by utilizing a modified maximal marginal relevance scheme.

17. The system of claim 16, the maximal marginal relevance scheme employs the algorithm argmin $$\underset{q'}{\mathrm{argmin}}\Big[\lambda\|q,q'\| - (1-\lambda)\underset{q''}{\mathrm{min}}\|q',q''\|\Big],$$

where $\lambda$ is an interpolation factor that is established a priori, and q" represents one or more previous queries that have already been considered prior to the consideration of q'.

18. The system of claim 15, the objects comprising one or more of documents, sounds, videos, images, and web sites.

19. The system of claim 15, a user selects one of the previous queries, the selected previous query employed as the user search query.

20. A cellular phone comprising the system of claim 15.

21. A personal digital assistant comprising the system of claim 15.

22. The system of claim 15 stored on a client.

23. The system of claim 15, the data store being one of the Internet, an intranet, a server, and a hard drive.

24. The system of claim 15, further comprising a serendipity component employed to select an amount of overlap required between a return set of the user search query and return sets of the previous queries in connection with determining the level of relatedness between the user search query and the previous queries.

25. The system of claim 24, the serendipity component being alterable by a user.

26. The system of claim 24, the serendipity component being automatically adjusted based at least in part upon one or more of user state, user identity, user context, and user history.

27. A method for assisting a user search over a plurality of objects, comprising:
  receiving a user search query; searching a data store for objects according to the user search query to create a user search result set, the objects being associated with queries previously employed to locate the objects;
  reviewing the previously employed queries to locate one or more objects within the user search result set;
  determining a level of relatedness between the user search query and the previously employed queries, wherein the level of relatedness is based at least in part upon distance metrics between the user search query and the previously employed queries, and wherein the distance metrics are determined by utilizing the algorithm $$\|q, q'\| = 1 - \frac{|R[q] \cap R[q']|}{|R[q] \cup R[q']|},$$

where $\|q,q'\|$ is a distance metric between the user search query q and one or more previous queries q', and R is a binary relation on Q×D, wherein Q is a set of queries previously employed by the search engine and D is a set of objects within a data store that is searched over by the search engine; selecting a query that was previously employed based upon a calculated level of relatedness between a result set of the previous query and the user search result set; and displaying the retrieved query.

28. The method of claim 27, further comprising utilizing a modified maximal marginal relevance scheme to calculate the level of relatedness between the result set of the previous query and the user search result set.

29. The method of claim 27, further comprising positioning the selected query within a plurality of queries according to the level of relatedness.

30. The system of claim 27, further comprising choosing the displayed query and utilizing the displayed query as the user search query.

31. The method of claim 27, the data store being one of the Internet, an intranet, a server, and a hard drive.

32. A system that assists a user in connection with searching for objects, comprising:
  means for associating objects with queries previously utilized to locate such objects;
  means for searching over the objects given a user search query;
  means for determining a level of relatedness between the previously utilized queries and the user search query; and
  means for displaying previously utilized queries according to the determined level or relatedness, wherein the level of relatedness is determined based at least in part upon distance metrics between the user search query and the previously employed queries, and wherein the distance metrics are determined by utilizing the algorithm $$\|q, q'\| = 1 - \frac{|R[q] \cap R[q']|}{|R[q] \cup R[q']|}$$

where $\|q,q'\|$ is a distance metric between the user search query q and one or more previous queries q', and R is a binary relation on Q×D, wherein Q is a set of queries previously employed by the search engine and D is a set of objects within a data store that is searched over by the search engine.

33. A computer readable medium having computer executable instructions stored thereon to:
  search over a plurality of objects given a user search query, the objects associated with queries previously employed to locate such objects;
  calculate a level of relatedness between the user search query and the previously employed queries, wherein the level of relatedness is determined based at least in part upon distance metrics between the user search query and the previously employed queries, and wherein the distance metrics are determined by utilizing the algorithm $$\|q, q'\| = 1 - \frac{|R[q] \cap R[q']|}{|R[q] \cup R[q']|}$$

where $\|q,q'\|$ is a distance metric between the user search query q and one or more previous queries q', and R is a binary relation on Q×D, wherein Q is a set of queries previously employed by the search engine and D is a set of objects within a data store that is searched over by the search engine; and
  display one or more previous queries according to the calculated level of relatedness.

* * * * *